(12) United States Patent
Liu et al.

(10) Patent No.: US 11,290,159 B2
(45) Date of Patent: Mar. 29, 2022

(54) ELECTRONIC DEVICE AND COMMUNICATION METHOD

(71) Applicant: Sony Corporation, Tokyo (JP)

(72) Inventors: Wendong Liu, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/636,035

(22) PCT Filed: Sep. 10, 2018

(86) PCT No.: PCT/CN2018/104835
§ 371 (c)(1),
(2) Date: Feb. 3, 2020

(87) PCT Pub. No.: WO2019/052420
PCT Pub. Date: Mar. 21, 2019

(65) Prior Publication Data
US 2021/0028832 A1 Jan. 28, 2021

(30) Foreign Application Priority Data

Sep. 13, 2017 (CN) .......................... 201710820287.6

(51) Int. Cl.
*H04L 27/22* (2006.01)
*H04B 7/0452* (2017.01)
*H04B 7/0417* (2017.01)

(52) U.S. Cl.
CPC ......... *H04B 7/0452* (2013.01); *H04B 7/0417* (2013.01)

(58) Field of Classification Search
CPC . H04L 27/2332; H04L 27/2331; H04L 27/22; H04W 72/0453; H04W 72/0406
(Continued)

(56) References Cited

U.S. PATENT DOCUMENTS 7,206,608 B1    4/2007   Wu et al.
10,063,105 B2 *  8/2018   Leabman ................ H02J 50/15
(Continued)

FOREIGN PATENT DOCUMENTS

CN    101350652 A    1/2009
CN    101848021 A    9/2010
(Continued)

OTHER PUBLICATIONS

Husbands Ryan et al: "Transmit antenna selection for massive MIMO: A knapsack problem formulation", 2017 IEEE International Conference On Communications (ICC), IEEE, May 21, 2017 (May 21, 2017), pp. 1-6, DOI: 10.1109/ICC.2017.7996694.
(Continued)

*Primary Examiner* — Khai Tran
(74) *Attorney, Agent, or Firm* — Xsensus LLP

(57) ABSTRACT

An electronic device and a communication method. The electronic device comprises: a processing circuit, configured to: determine transmitting signals simultaneously to at least two user devices and proximity of directions of downlink transmission signals for the at least two user devices satisfying a predetermined condition; and acquire, an amount of antenna elements to be activated for downlink beamforming, which is determined based on the directions of downlink transmission signals for the at least two user devices.

19 Claims, 17 Drawing Sheets

(58) Field of Classification Search
USPC .......................................................... 375/330
See application file for complete search history.

(56) References Cited

U.S. PATENT DOCUMENTS

| | | | |
|---|---|---|---|
| 2002/0146029 A1* | 10/2002 | Kavak | H04J 13/18 |
| | | | 370/441 |
| 2009/0042618 A1* | 2/2009 | Hedayat | H04B 7/0413 |
| | | | 455/562.1 |
| 2014/0105120 A1 | 4/2014 | Jose et al. | |
| 2015/0180561 A1 | 6/2015 | Jindal | |
| 2017/0026094 A1 | 1/2017 | Milleth et al. | |
| 2018/0310311 A1* | 10/2018 | Li | H04L 5/0073 |

FOREIGN PATENT DOCUMENTS

| | | |
|---|---|---|
| CN | 103348608 A | 10/2013 |
| CN | 103499811 A | 1/2014 |
| CN | 104821840 A | 8/2015 |
| CN | 105684323 A | 6/2016 |
| CN | 106374989 A | 2/2017 |
| EP | 2166808 A | 3/2010 |
| WO | 2016/045724 A1 | 3/2016 |
| WO | WO2016155532 A | 10/2016 |

OTHER PUBLICATIONS

International Search Report and Written Opinion dated Dec. 6, 2018 for PCT/CN2018/104835 filed on Sep. 10, 2018, 10 pages including English Translation of the International Search Report.
Catt, "Discussion on transmission schemes for NR MIMO," 3GPP TSG RAN WG1 Meeting No. 87, R1-1611378, Reno, USA, Nov. 14-18, 2016, 7 pages.
Huawei and Hisilicon, "General views on DL beam management," 3GPP TSG RAN WG1 NR Ad Hoc Meeting, R1-1711636, Qingdao, China, Jun. 27-30, 2017, 12 pages.
ZTE Corporation and ZTE Microelectronics, "Overview on NR MIMO for Sub-6 GHz," 3GPP TSG RAN WG1 Meeting No. 85, R1-164294, Nanjing, China, May 23-27, 2016, 5 pages.
Ryan Husbands et al., IEEE ICC 2017 Wireless Communications Symposium, May 21, 2017, "Transmit Antenna Selection for Massive MIMO: A Knapsack Problem Formulation" 6 pp.
Communication pursuant to Article 94(3) EPC dated Jan. 3, 2022, in corresponding European Patent Application No. 18 857 319.0, 6 pp.

* cited by examiner

ELECTRONIC DEVICE AND COMMUNICATION METHOD

CROSS REFERENCE TO RELATED APPLICATIONS

This application is based on PCT filing PCT/CN2018/104835, filed Sep. 10, 2018, which claims the benefit of Chinese patent application No. 201710820287.6, filed Sep. 13, 2017, the entire contents of each are incorporated herein by reference.

TECHNICAL FIELD

The present disclosure relates generally to an electronic device and a communication method, and more particularly, to an electronic device and a communication method for a millimeter wave massive multi-input multiple-output antenna system.

BACKGROUND

As one of the key technologies of next-generation wireless communication (5G), Massive multiple-input multiple-output (Massive MIMO) technology attracts wide attention. As the number of antennas in the massive MIMO system increases, the channel coefficients tend to be orthogonal, and such a property is referred to hereinafter as asymptotic orthogonality. Benefited from the asymptotic orthogonality introduced by the massive MIMO system, the system spectrum efficiency and energy efficiency can be effectively improved through low-complexity linear signal processing algorithm(s). In such a system, conjugate-transposed beamforming may be used to effectively eliminate interference from uncorrelated channels of different User Equipment (UE).

The asymptotic orthogonality in the massive MIMO system depends on a complex scattering environment in which a wireless channel is located, and in which a Non-line-of-sight (NLoS) channel is a main scenario, and superposition of multi-path signals from multiple clusters can also be approximately modeled on the condition that channel coefficients obey the complex Gaussian distribution, so that channel correlation among different user equipment is very low, which has been widely applied in the cell communication scenario in traditional LTE/LTE-A.

For extremely high frequency bands such as millimeter-wave (mmWave) and decimillimetre-wave, the path loss of a non-Line-of-sight channel is relatively high, so that a Line-of-sight (LoS) channel becomes a main scenario in extremely high frequency band communication such as millimeter wave. For the existing decimeter wave and centimeter wave communication systems, with the development of technology, new communication scenarios such as aircraft communication scenario, will be introduced, wherein the wireless channel between an access point and an aerial aircraft such as an unmanned aerial vehicle is less obstructed by obstacles, so such new communication scenarios can also be regarded as the communication scenarios mainly comprising the line-of-sight channel. In the case of the line-of-sight channel, the channel coefficients do not obey the complex Gaussian distribution, and a relatively strong correlation exists between different channels, so the asymptotic orthogonality of the massive MIMO system is poor in applicability in the millimeter wave frequency band communication. Although in a communication system such as millimeter wave, a hybrid precoding architecture may be adopted to reduce power consumption and complexity of hardware implementations, the complexity of joint optimization of digital precoding and analog precoding in the hybrid precoding architecture is still high, which results in a relatively large cost in practical applications.

SUMMARY

An object of the present disclosure is to provide an electronic device and a communication method that enable lower complexity, more efficient beamforming transmission based on traditional conjugate transpose. The electronic device and the communication method are particularly suitable for the massive MIMO system in the millimeter wave communication scenario or aircraft communication scenario.

An aspect of the present disclosure relates to an electronic device comprising: a processing circuit, configured to: determine transmitting signals simultaneously to at least two user devices and proximity of directions of downlink transmission signals for the at least two user devices satisfying a predetermined condition; and acquire, an amount of antenna elements to be activated for downlink beamforming, which is determined based on the directions of downlink transmission signals for the at least two user devices.

Yet another aspect of the present disclosure relates to an electronic device comprising processing circuit configured to determine a receiving quality for each transmission beam used for a transmission beam training; determine, based on beam directions of a transmission beam with the best receiving quality and its neighbor transmission beams, an amount of antenna elements to be activated for downlink beamforming transmission for said electronic device; and feed the amount and the sequence numbers of the transmission beam with the best receiving quality and its neighbor transmission beams back to another electronic device that initiates the transmission beam training.

Another aspect of the present disclosure relates to an electronic device comprising processing circuit configured to determine a receiving quality for each transmission beam used for a transmission beam training; calculate transmission angles of downlink transmission signals from another electronic device that initiates the transmission beam training towards the electronic device, with respect to the transmission beam with the best receiving quality; determine, based on the transmission angles and beam directions of neighbor transmission beams of the transmission beam with the best receiving quality, an amount of antenna elements to be activated for downlink beamforming transmission for said electronic device; and feed the transmission angles, the amount and the sequence numbers of the transmission beam with the best receiving quality and the neighbor transmission beams back to the other electronic device that initiates the transmission beam training.

Yet another aspect of the present disclosure relates to an electronic device comprising processing circuit configured to transmit an uplink reference signal to another electronic device to calculate a direction of the uplink reference signal; receive a downlink reference signal, which is transmitted though downlink beamforming by the other electronic device using an amount of antenna elements to be activated for downlink beamforming, wherein the amount of antenna elements to be activated for downlink beamforming is determined based on the direction of the uplink reference signal; and estimate the downlink channel through the downlink reference signal, and feed noise power back to the other electronic device.

Yet another aspect of the present disclosure relates to a communication method comprising: determine transmitting signals simultaneously to at least two user devices and proximity of directions of downlink transmission signals for the at least two user devices satisfying a predetermined condition; and acquire, an amount of antenna elements to be activated for downlink beamforming determined based on the directions of downlink transmission signals for the at least two user devices.

Yet another aspect of the present disclosure relates to a communication method comprising: determining a receiving quality for each transmission beam used for a transmission beam training; determining, based on beam directions of a transmission beam with the best receiving quality and its neighbor transmission beams, an amount of antenna elements to be activated for downlink beamforming transmission for an electronic device; and feeding the amount and the sequence numbers of the transmission beam with the best receiving quality and its neighbor transmission beams back to another electronic device that initiates the transmission beam training.

Yet another aspect of the present disclosure relates to a communication method comprising: determining a receiving quality for each transmission beam used for a transmission beam training; calculating a transmission angle of downlink transmission signals from another electronic device that initiates the transmission beam training towards an electronic device, with respect to the transmission beam with the best receiving quality; determining, based on the transmission angle and beam directions of neighbor transmission beams of the transmission beam with the best receiving quality, an amount of antenna elements to be activated for downlink beamforming transmission for said electronic device; and feeding the transmission angle, the amount and the sequence numbers of the transmission beam with the best receiving quality and the neighbor transmission beams back to the other electronic device that initiates the transmission beam training.

Yet another aspect of the present disclosure relates to a communication method comprising: transmitting an uplink reference signal to another electronic device to calculate a direction of the uplink reference signal; receiving a downlink reference signal, which is transmitted though downlink beamforming by the other electronic device using an amount of antenna elements to be activated for downlink beamforming determined based on the direction of the uplink reference signal; and estimating the downlink channel through the downlink reference signal, and feeding noise power back to the other electronic device.

Yet another aspect of the present disclosure relates to a computer-readable storage medium having instructions stored thereon, which when loaded and executed by a processor, cause the processor to perform the aforementioned communication method.

Yet another aspect of the present disclosure relates to an electronic device comprising: a processing circuit configured to: determine proximity of at least two target devices satisfying a predetermined condition; and acquire, an amount of antenna elements to be activated for transmitting beamformed radio wave, wherein said amount is determined based on said proximity.

Therefore, according to the aspects of the present disclosure, by determining the number of antenna elements activated, lower complexity and more efficient beamforming based on traditional conjugate transpose can be performed.

DRAWINGS

The above and other objects and advantages of the present disclosure will be further described with reference to the accompanying drawings in conjunction with the specific embodiments. In the drawings, the same or corresponding technical features or components will be denoted by the same or corresponding reference signs.

FIG. 1 illustrates a schematic configuration of a communication environment according to an embodiment of the present disclosure;

FIG. 2A is a schematic diagram illustrating the direction of downlink transmission signals from a base station to a user device; FIG. 2B specifically illustrates the asymptotic characteristic of the interference between the user devices of the traditional complex Gaussian channel and of the millimeter-wave line-of-sight channel as the number of antenna elements increases; FIG. 2C illustrates a schematic diagram in which among all antenna elements, some of them are activated and others are deactivated;

FIG. 3 schematically illustrates a block diagram of an electronic device on a control device side according to an embodiment of the present disclosure;

Figure 9A:
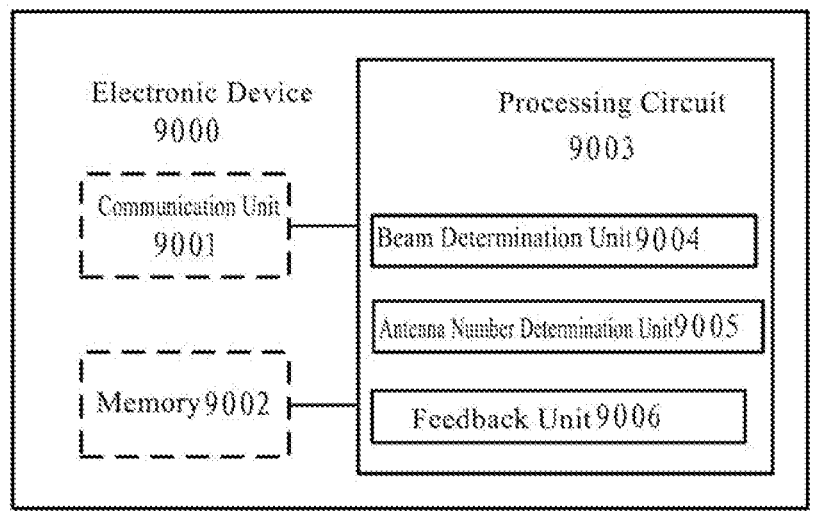
Figure 9B:
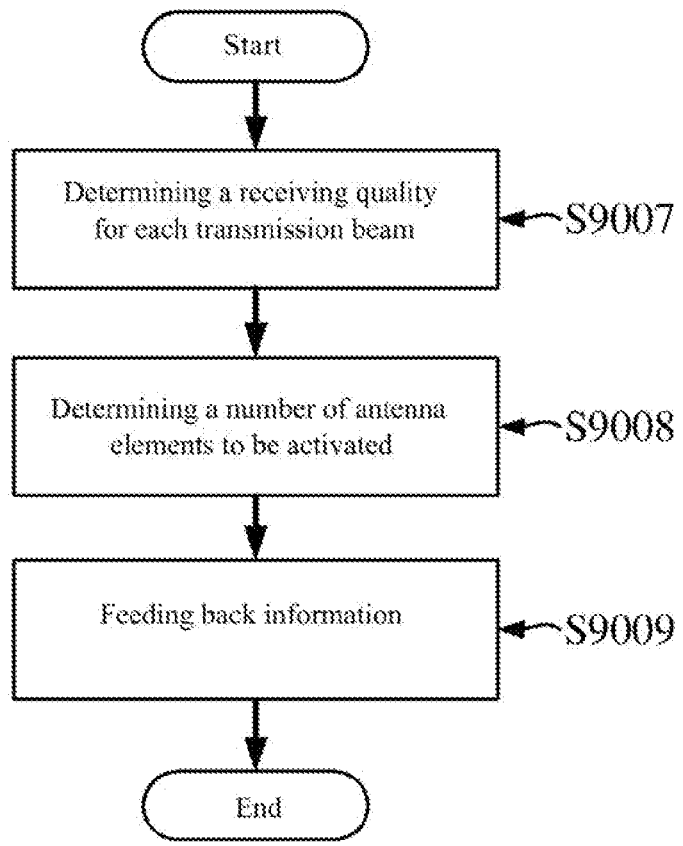
Figure 10A:
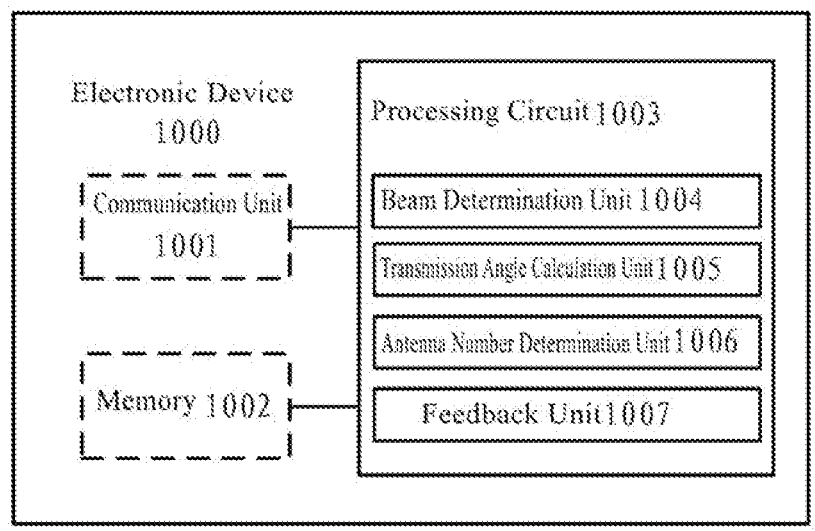
Figure 10B:
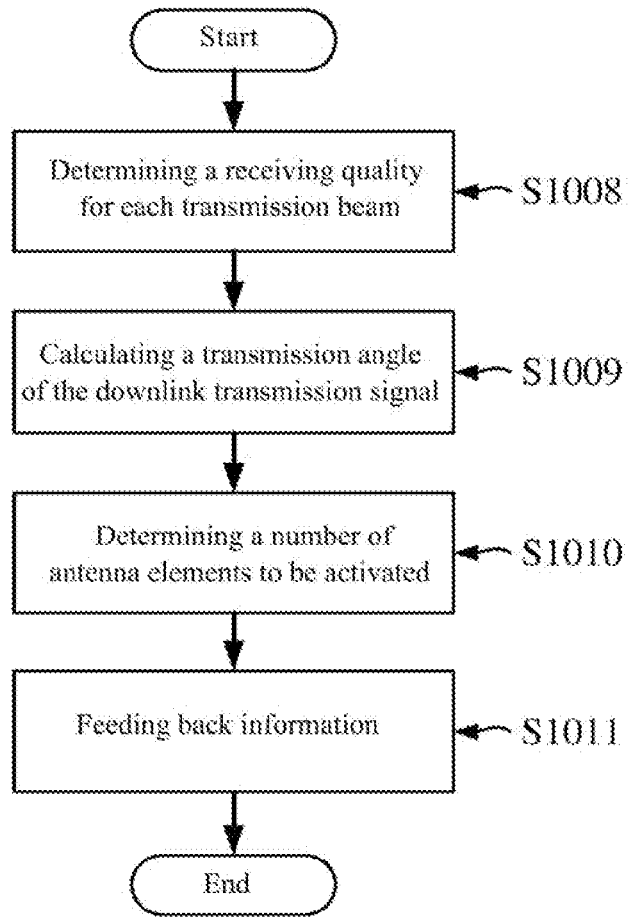
Figure 11A:
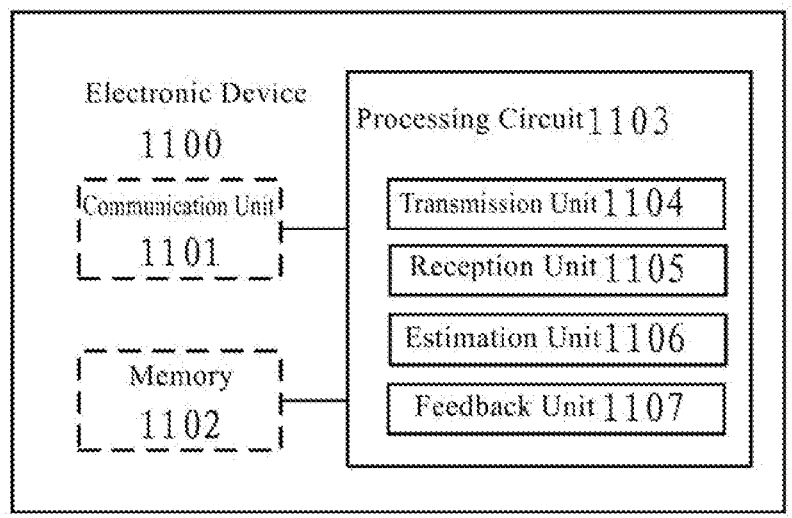
Figure 11B:
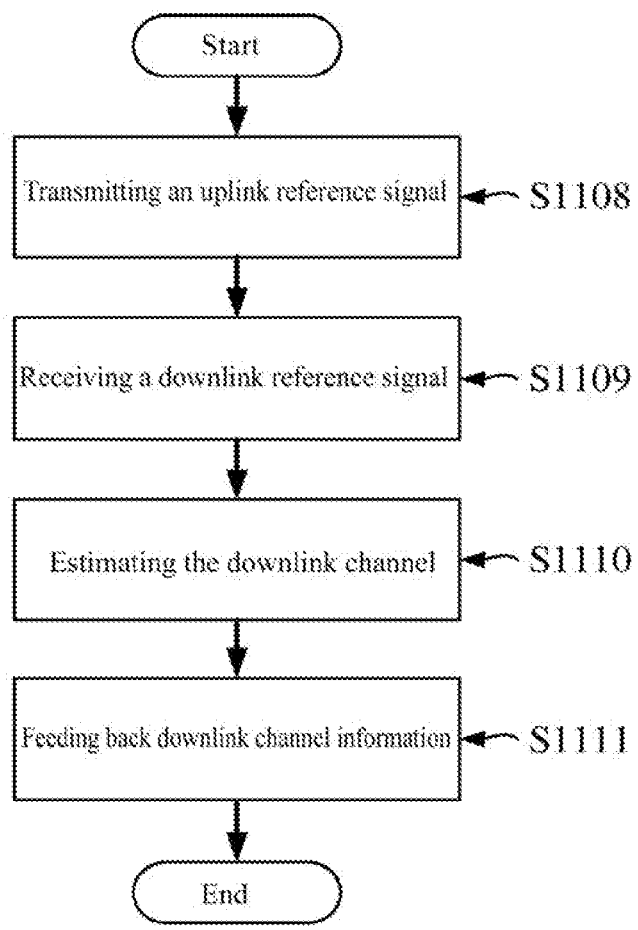
Figure 12:
Figure 13A:
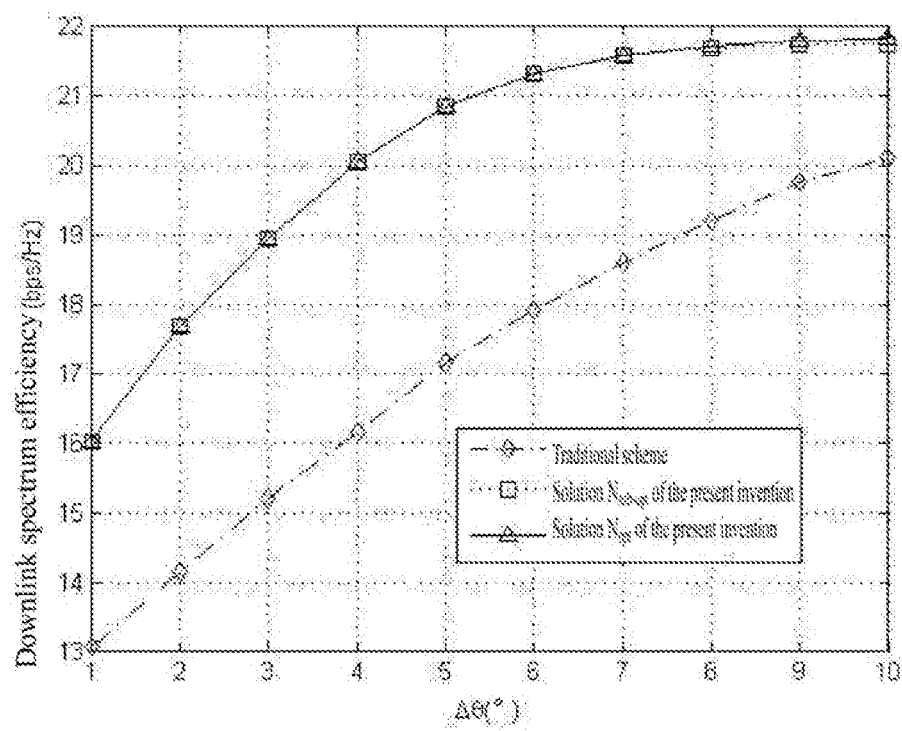
Figure 13B:
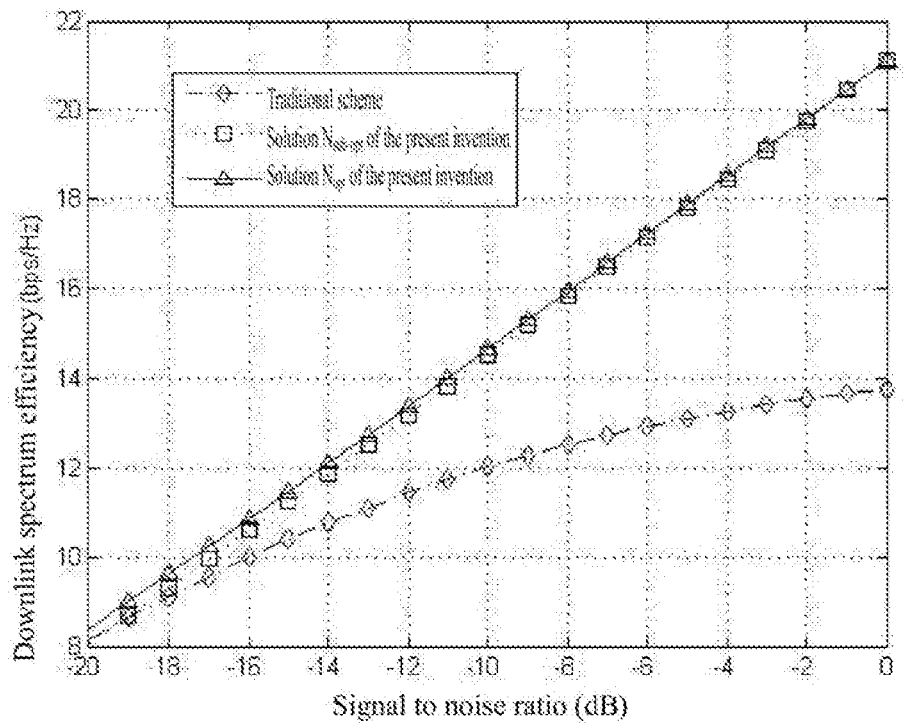
Figure 13C:
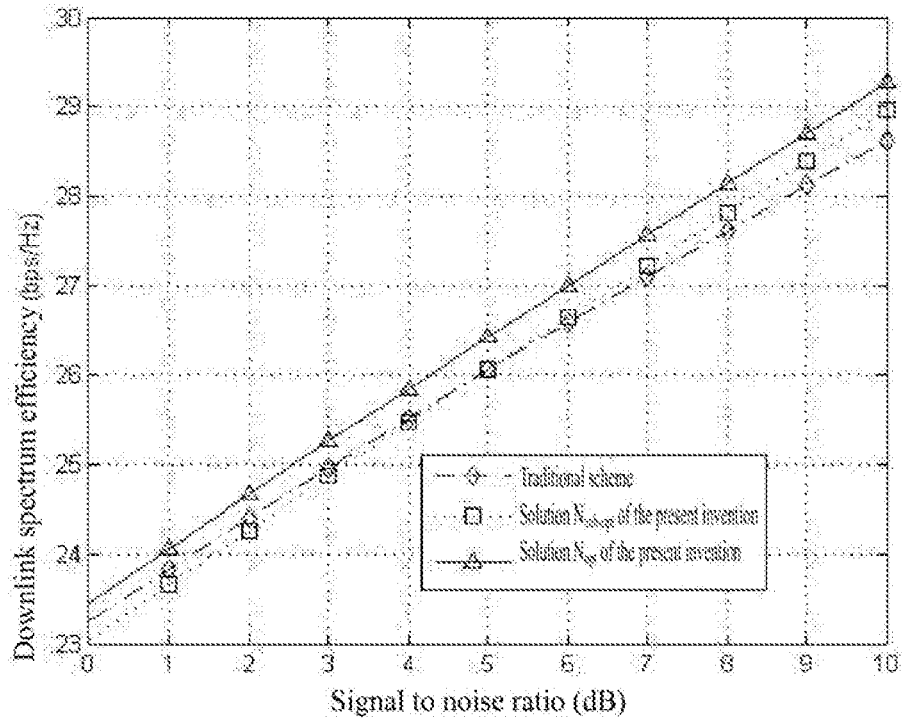
Figure 14:
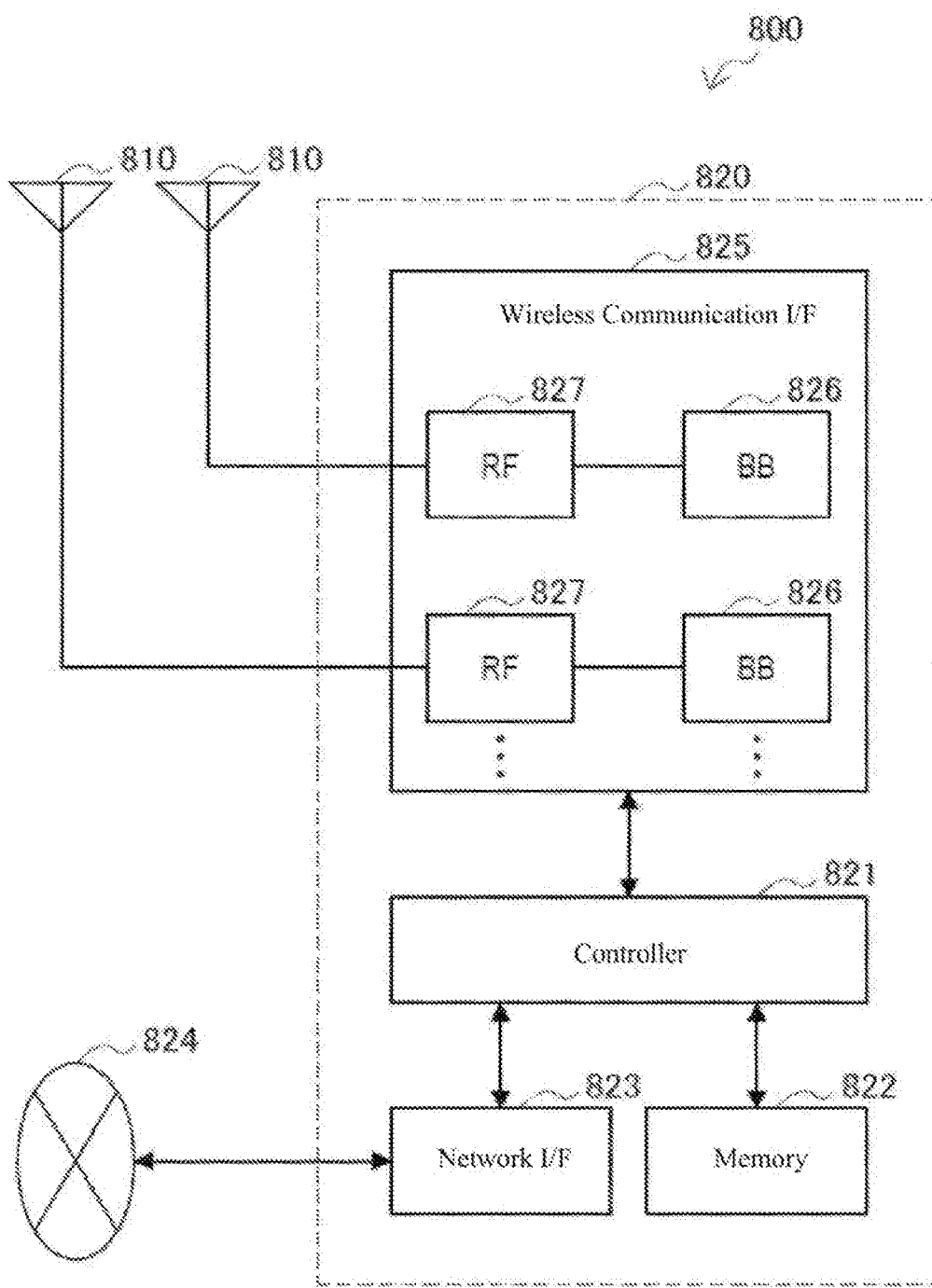
Figure 15:
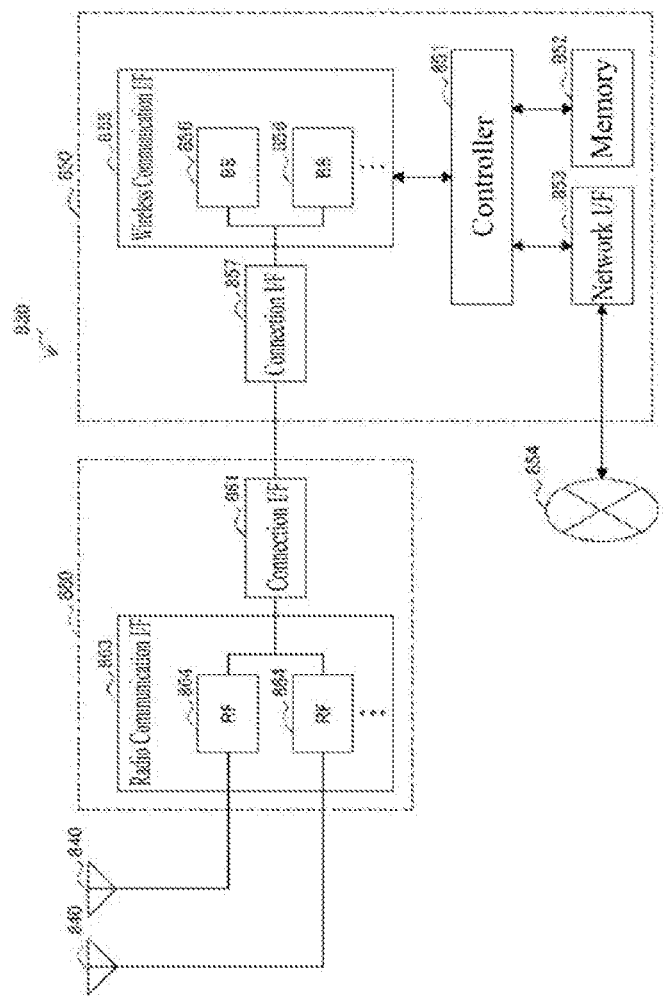
Figure 16:
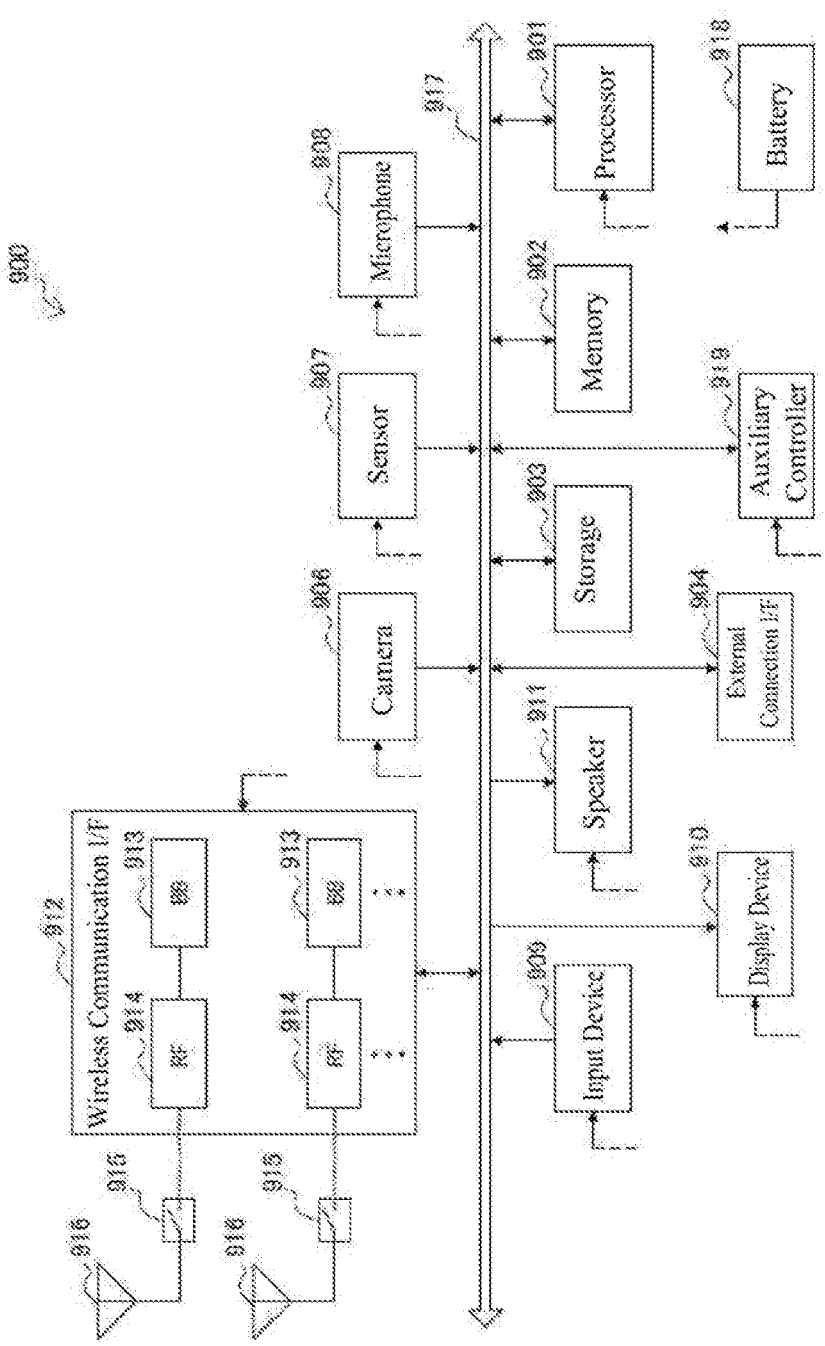
Figure 17:
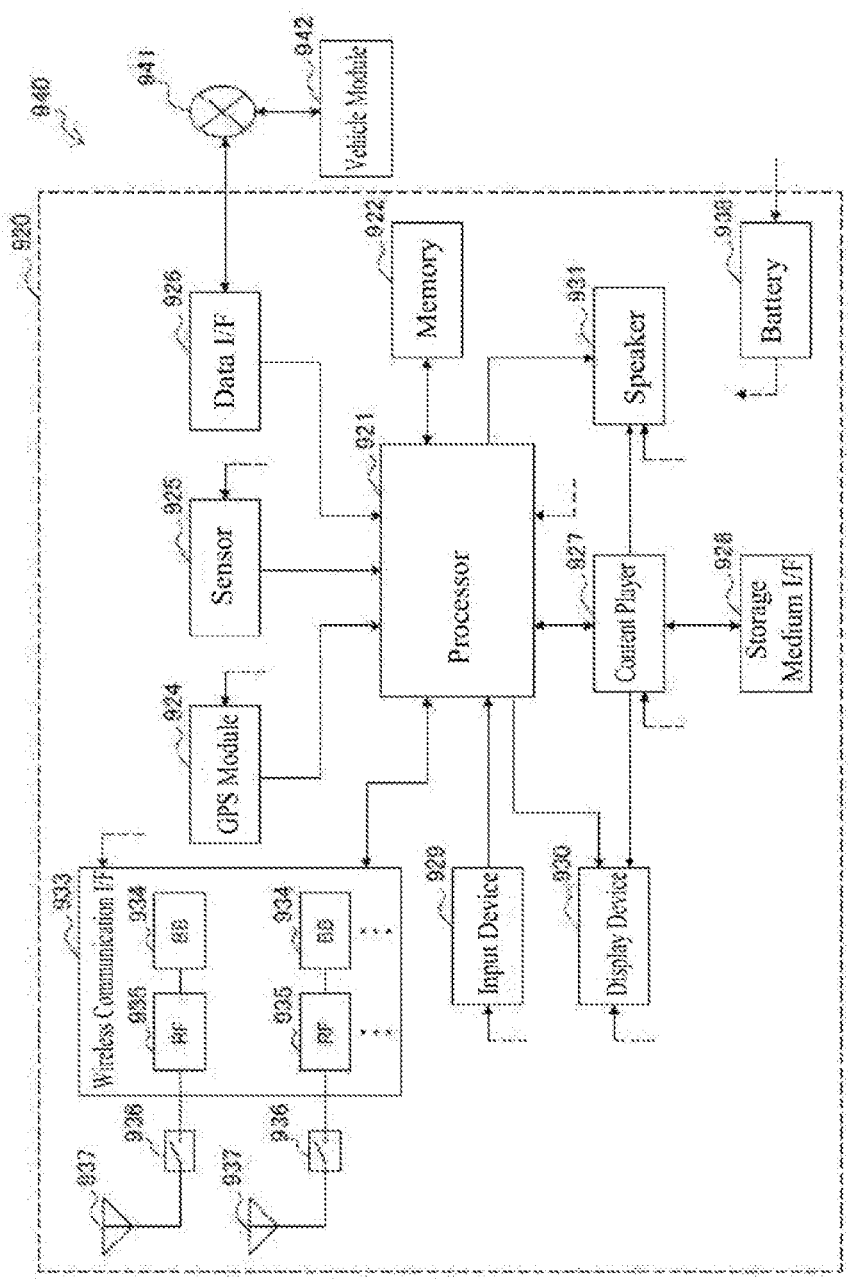

FIGS. 9A-9B schematically illustrate a block diagram and a flowchart of an electronic device on a user device side according to one embodiment of the present disclosure;

FIGS. 10A-10B schematically illustrate a block diagram and a flowchart of an electronic device on a user device side according to another embodiment of the present disclosure;

FIGS. 11A-11B schematically illustrate a block diagram and a flowchart of an electronic device at a user device side according to yet another embodiment of the present disclosure;

FIG. 12 illustrates a comparison between the number of resource blocks employed for traditional user scheduling and the number of resource blocks employed according to an embodiment of the present disclosure;

FIGS. 13A-13C illustrate performance simulation results according to the embodiments of the present disclosure;

FIG. 14 is a block diagram illustrating a first example of a schematic configuration of a control device side electronic device according to an embodiment of the present disclosure;

FIG. 15 is a block diagram illustrating a second example of a schematic configuration of a control device side electronic device according to an embodiment of the present disclosure;

FIG. 16 is a block diagram illustrating an example of a schematic configuration of a smartphone according to an embodiment of the present disclosure; and FIG. 17 is a block diagram illustrating an example of a schematic configuration of a car navigation apparatus according to an embodiment of the present disclosure.

DETAILED DESCRIPTION

Exemplary embodiments of the present disclosure will be described hereinafter with reference to the accompanying drawings. For the sake of clarity and conciseness, not all features of the embodiments have been described in the specification. It should be appreciated, however, that in the implementations of the embodiments, numerous implementation-specific settings must be made to achieve developers' specific goals, such as compliance with device-related and business-related constraints, which may vary from one implementation to another. Moreover, it will be appreciated that such a development effort might be complex and time-consuming, but would nevertheless be a routine for those of ordinary skill in the art having the benefit of this disclosure.

Here, it should also be noted that, in order to avoid obscuring the present disclosure with unnecessary details, only processing steps and/or device structures closely associated with at least the solution according to the present disclosure are shown in the drawings, while other details less associated with the present disclosure are omitted.

Next, description is made in the following order.

Figure 1:
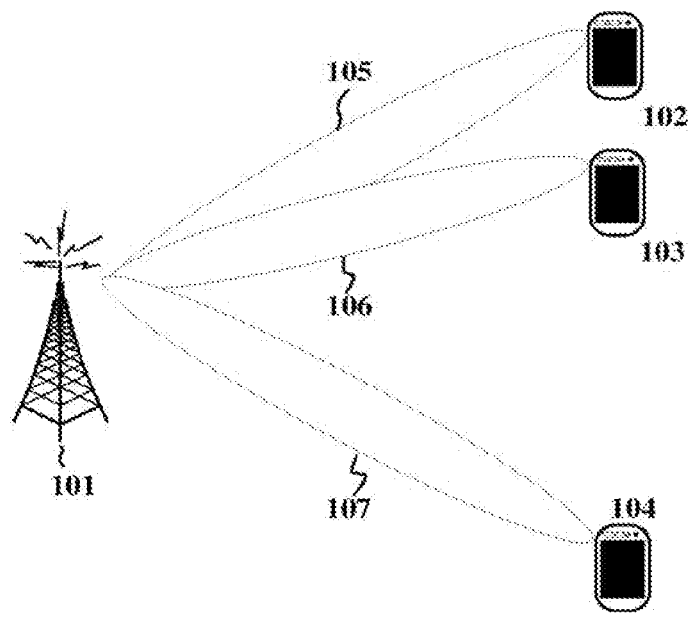

1. Schematic Configuration of a Communication Environment According to an Embodiment of the Present Disclosure FIG. 1 shows a schematic configuration of a communication environment according to an embodiment of the present disclosure. In FIG. 1, a base station 101 in a cell is configured with a massive MIMO system that communicates with different user devices 102, 103 and 104, through conjugate transposed beamforming, e.g. transmission beams 105, 106 and 107, respectively. As described above, in the case where the non-line-of-sight channel is the main scenario, the channel coefficients obey the complex Gaussian distribution, and thus channel correlation between different user devices is very low and has a relatively small interference. In the case where the line-of-sight channel is the main scenario, the channel coefficients do not obey the complex Gaussian distribution, so the channel correlation between different user devices is very high and has a relatively large interference. Especially, the interference is more obvious for the user devices adjacent to the transmission beam, as the user devices 102 and 103 in FIG. 1, in the case of downlink transmission by using the traditional conjugate transposed beamforming based on the asymptotic orthogonality, the beams 105 and 106 will cause a relatively large interference between the user devices 102 and 103, thereby greatly reducing the spectrum efficiency of the system. Therefore, there is a need to improve the traditional conjugate transposed beamforming in the case of simultaneous signal transmission, e.g. between the base station 101 and the user devices 102, 103, thereby increasing the spectrum efficiency of the system.

A downlink transmission model and channel properties will first be described below in detail by taking the traditional decimeter-wave band and millimeter-wave band communication as an example, so that the following aspects of the present disclosure can be better understood. It should be understood that while communication in the traditional decimeter-wave band and millimeter-wave band is described herein, it is an example only but does not limit the applications of the present disclosure; indeed, the present disclosure may be applied to communications in various suitable frequency bands.

1.1 Downlink Transmission Model

To simplify the model, it is assumed that user device (such as user devices 102 and 103) employs a single antenna. The base station 101 is configured with an M×1 uniformly-spaced linear array (ULA), and a spacing D between the antenna elements is a half wavelength D=λ/2. Let $h_1, h_2 \in C^{M \times 1}$ be a channel vector between the base station 101 and the two user devices 102 and 103, then the reception symbols $y_1, y_2$ may be represented as:

$$y_1 = h_1^T b_1 s_1 + h_1^T b_2 s_2 + n_1 \quad (1)$$

$$y_2 = h_2^T b_1 s_1 + h_2^T b_2 s_2 + n_2 \quad (2)$$

where $s_1, s_2$ are transmission symbols, and $n_1, n_2$ are additive Gaussian white noise symbols with power $\sigma_n^2$. By using the traditional analog conjugate transposed beamforming, the beamforming vector is $$b_i = \frac{1}{\sqrt{M}} h_i^*, i = 1, 2,$$

where "*" denotes a conjugate operation. A downlink average spectrum efficiency C can be calculated by:

$$C = \log_2 \left( 1 + \frac{|h_1^T b_1|^2}{|h_1^T b_2|^2 + \sigma_n^2} \right) \quad (3)$$

For complex scattering environment channel coefficients of the traditional decimeter wave band, the asymptotic orthogonality is as follows:

$$\lim_{M \to \infty} \frac{h_i^H h_j}{M} = \delta_{i,j} = \begin{cases} 1, i = j \\ 0, i \neq j \end{cases} \quad (4)$$

Based on the above equation, in the traditional decimeter wave band communication, it shows that when the number of antenna elements in the massive MIMO system of the base station 101 increases, the interference $|h_1^T b_2|^2$ between the user devices 102 and 103 can be gradually reduced.

1.2 Line-of-Sight Channel Properties

Figure 2A:
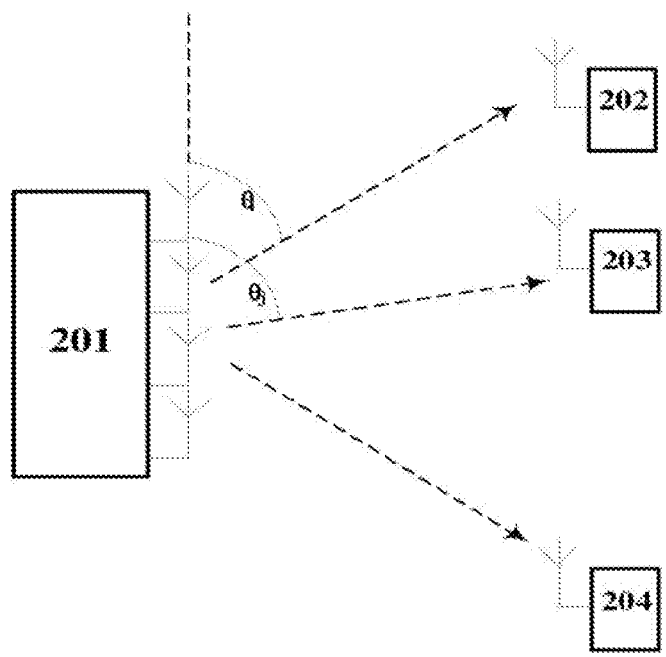

On the basis of the downlink transmission model in section 1.1, for the line-of-sight channel as the main scenario in the millimeter wave band, assuming that a single-path spatial channel model is adopted, then $h_i$ can be expressed as follows:

$$h_i = [1, e^{-j\pi \cos \theta_i}, \ldots, e^{-j\pi(M-1)\cos \theta_i}]^T \quad (5)$$

where $\theta_i$ is the direction (transmission angle) of the downlink transmission signal from the base station 101 to the user devices 102 and 103, which is specifically shown in FIG. 2A and can be understood as an angle between the transmission signal and the plane of the antenna array, for example. Therefore, the asymptotic orthogonality adopting the aforementioned transmission model can be further expressed as:

$$\left| \frac{h_i^H h_j}{M} \right| = \left| \sum_{m=0}^{M-1} e^{-j\pi(\cos\theta_i - \cos\theta_j)} \right| = \left| \frac{\sin\frac{\pi M}{2}\phi}{M\sin\frac{\pi}{2}\phi} \right| \quad (6)$$

$\phi = \cos \theta_i - \cos \theta_j$ in the above equation represents the correlation between channels $h_i$ and $h_j$, in other words, represents the proximity between the two user devices 102, 103. For neighboring user devices (user devices with highly correlated channels), $\theta_1 \to \theta_2$, $\phi \to 0$ causes a severe interference $$|h_1^T b_2|^2 \xrightarrow{\phi \to 0} M$$

between the user devices, i.e. the more antennas are used, the larger the interference is, and the average spectrum efficiency is also severely reduced.

Figure 2B:
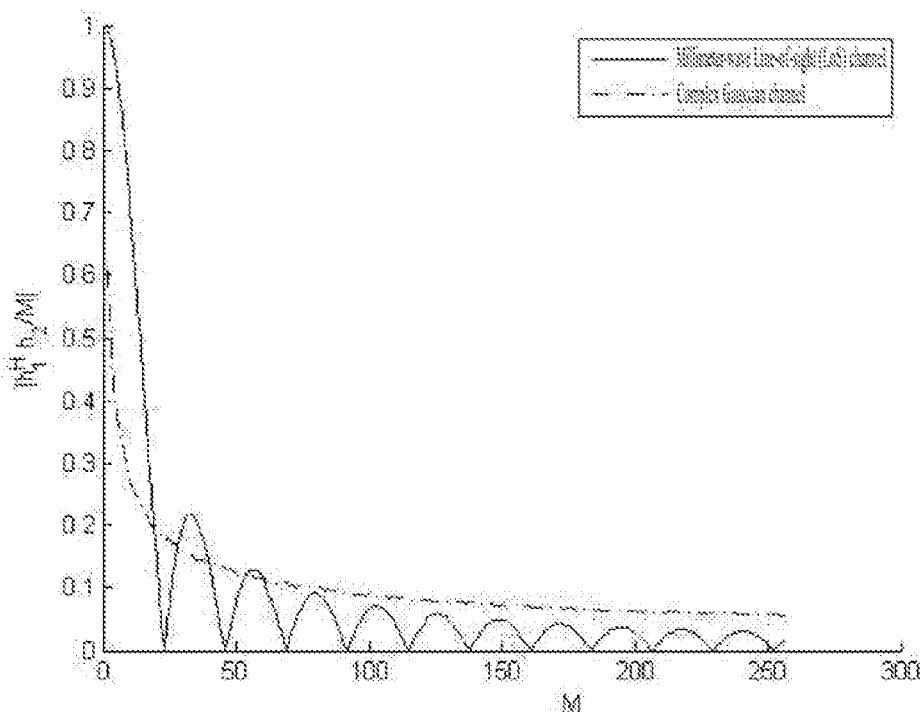

FIG. 2B specifically illustrates the asymptotic characteristic of the interference between the user devices of the traditional complex Gaussian channel and of the millimeter-wave line-of-sight channel as the number of antenna elements increases, which is realized by the inventors through simulation, wherein the abscissa represents the number of antenna elements and the ordinate represents the asymptotic orthogonality between two user devices. In FIG. 2B, the complex Gaussian channel is under the condition that each channel coefficient obeys the standard normal distribution, and the curve in the figure is an average of 1000 times of simulation. Let $$A(M, \phi) = \left|\sin\frac{\pi M}{2}\phi / M \sin\frac{\pi}{2}\phi\right|,$$

and $\phi=\cos 90°-\cos 85°$ in FIG. 2B, the curve starting from the ordinate 0.6 shows that in the traditional complex Gaussian channel environment, $|h_1^H h_2/M|$ stably decreases as the number of antenna elements increases, i.e., asymptotic orthogonality $$\lim_{M \to \infty} A(M, \phi) = 0$$

still applies, but the efficiency is relatively low. Unlike in the traditional complex Gaussian channel environment, for the millimeter-wave line-of-sight channel, $A(M,\phi)$ attenuates in an oscillation manner as M increases, see the curve starting from the ordinate 1. At the right-side trough point, $A(M,\phi)$ is very close to 0. Therefore, the number M of antennas at the trough point can be considered to activate the antenna elements for downlink beamforming so as to improve the orthogonality of the adjacent user devices, thereby further reducing the interference between the user devices.

As can be seen from FIG. 2B, for a practical massive MIMO system, if the total number of antenna elements is large, the value M at the trough point may be smaller than the total number of antenna elements, that is, only some antenna elements are turned-on/activated and other antenna elements are turned-off/deactivated, so that th interference may be reduced and an optimal spectrum efficiency may be obtained. In this way, a digital precoding operation directed to a plurality of user devices can be eliminated, and the interference among the user devices is ensured to be suppressed within a certain range by deactivating a specific number of antenna elements, thereby reducing the complexity and operation overhead of the system. Physically this can be understood as that when a part of the antenna elements is turned-off, side lobes of the transmission beams of the turned-off antenna elements will no longer affect other user devices. It should be noted that in a particular situation, M may also be equal to the total number of antenna elements, i.e. activating all antenna elements without any turned-off antenna elements, e.g. in FIG. 2B, it is assumed that there are 256 antenna elements in total, and the asymptotic corresponding to the point where M takes 256 is exactly zero.

Figure 2C:
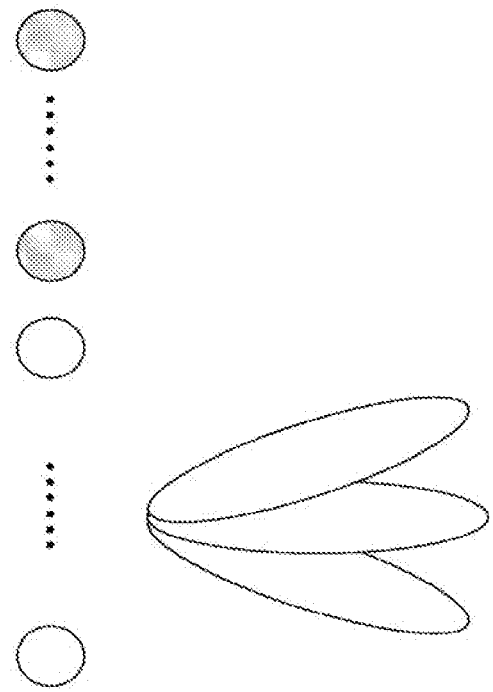

FIG. 2C illustrates a schematic diagram in which among all antenna elements, some of them are activated and others are deactivated, wherein white circles represent activated antenna elements with respect to the user device, that transmit downlink beams for communication with the user device, and dark circles represent deactivated antenna elements with respect to the user device, that are not used for transmitting downlink beams.

It should be noted that although the line-of-sight channel is described here as an example, it should be understood that the same also applies to some non-line-of-sight channels. In particular, almost the same effect is attained for the case where there is a strong reflection path to the user device in the non-line-of-sight channel. In fact, in the millimeter wave system, generally only a superposition of 3-5 paths is considered for the channel, including a direct transmission path signal, i.e. the line-of-sight channel, and a non-line-of-sight channel that is transmitted from the base station and reflected by buildings to the user device. The line-of-sight signal strength is much greater than the non-line-of-sight signal strength, so the beamformed signal direction will point to the direction of the direct transmission path. Therefore, when multipath superposition including the line-of-sight channel is carried out, it is possible to only consider the case of the line-of-sight channel, and the direction of signals transmitted thereby can be taken as a main factor of beamforming. Whereas in a scenario not including the line-of-sight channel, such as where the direct transmission path is obstructed by an obstacle, the non-line-of-sight channel is the main scenario. In this case, it is enough to mainly consider the direction of the reflection path with the strongest signal.

Further, based on the above principle analysis, it can be understood that the technical solution of the present disclosure can also be extended to non-communication systems involving beamforming, such as a phased-array antenna radar system. In the process of radar detection by using beamforming, if two detection targets are adjacent to each other, a side lobe of a transmission beam of an antenna array for a first detection target will reach a second detection target, so that an echo is generated, which will affect the detection accuracy such as positioning and ranging of the first detection target. By applying the technical solution of the present disclosure, for example, the two detection targets can be preliminarily positioned according to the preliminary scanning of radar to determine the proximity, and if it is determined that the proximity satisfies a predetermined condition, a specific number of antenna elements are turned-off/deactivated to accurately detect the two detection targets.

Figure 3:
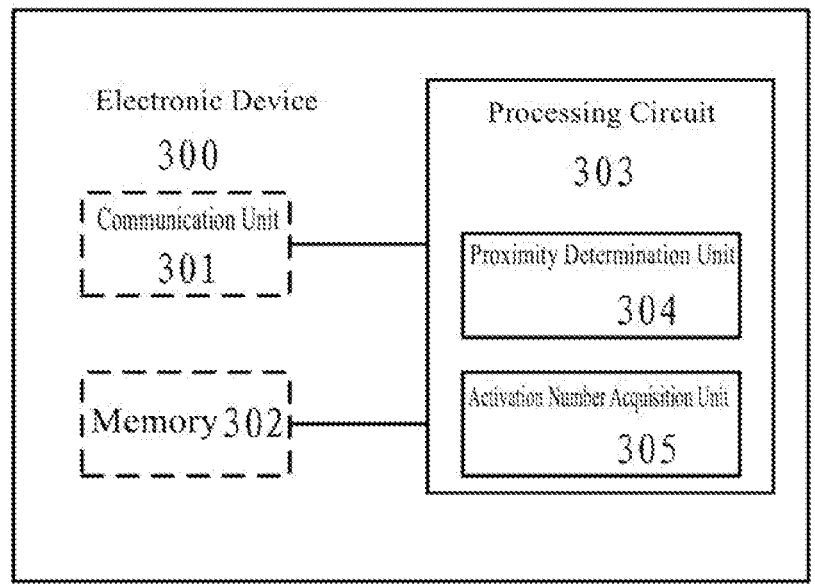

2. Embodiments of an Electronic Device on a Control Device Side According to the Present Disclosure FIG. 3 is a block diagram illustrating an electronic device 300 such as a base station and a radar tower, on the control device side according to an embodiment of the present disclosure. The electronic device may be located in various control devices or transmitting devices. The control device referred to herein is, for example, a base station such as eNB or gNB of the 5G communication standard of 3GPP, a remote radio head, a wireless access point, or the like, and the transmitting device includes, for example, a large-sized in-vehicle transmitting device or a fixed transmitting device (e.g., a drone management tower).

The electronic device 300 on the control device side according to one embodiment of the present disclosure may include, for example, a communication unit 301, a memory 302, and a processing circuit 303.

The processing circuit 303 of the electronic device 300 provides various functions of the electronic device 300. For example, the processing circuit 303 of the electronic device 300 may include a proximity determination unit 304 and an activation number acquisition unit 305. The proximity determination unit 304 may be configured to determine signal transmission to at least two user devices such as 102, 103 is simultaneously performed and the proximity of directions of downlink transmission signals for the at least two user devices 102, 103 satisfies a predetermined condition. In one example, the proximity of the two user devices 102, 103 is $\phi = \cos\theta_i - \cos\theta_j$ as described above with reference to FIG. 2A, where $\theta_i$ and are transmission directions of the downlink transmission signal from the base station 101 to the user devices 102 and 103, respectively. The processing circuit 303 may preset a threshold (e.g., determined based on an empirical value), and when $\phi = \cos\theta_i - \cos\theta_j$ is less than the threshold, the proximity determination unit 304 determines that the proximity satisfies the predetermined condition. For example, the processing circuit 303 may set, as the threshold, a value $\phi$ that corresponds to a 5 degree difference in the direction of the downlink transmission signals of the user devices 102 and 103. The direction of the transmission signal may be an angle between the downlink transmission signal transmitted from the base station 101 to the user devices 102 and 103 and the plane of the antenna array, or an angle for approximating the angle obtained by other means, as described in sections 4-1-2 below.

In another example, since both the base station 101 and the user devices 102 and 103 can know the beam direction of each transmission beam of the base station during the beamforming transmission, the setting of the threshold in the previous example can also be made by representing the direction of the transmission signal directly with the beam direction instead of the transmission angle. Alternatively, since the transmission beam neighboring to the transmission beam for the user device 102 causes a relatively large interference to the user device 102, the sequence number of two (one on the left and one on the right), or four (two on the left and two on the right) neighbor beams may be set as the threshold. For example, once the base station employs a transmission beam whose sequence number is equal to or smaller than the threshold for the other user device 103, the proximity determination unit 304 determines that the proximity satisfies the predetermined condition.

In yet another more specific example, channel information reported by the user device 102 may also be used to reflect the proximity of the directions of the transmission signals. For example, the base station 101 sends a CSI-RS reference signal for measuring a downlink channel state to the user device 102, and then the user device 102 provides, to the base station 101, measured channel direction information such as a precoding matrix indicator PMI, a CSI-RS resource indicator CRI, or a beam index BI (the CRI and the BI are used for feeding back a base station transmission beam with a stronger signal RSRP received by the user device). When the base station 101 performs signal transmission simultaneously to at least two user devices, such as 102 and 103, if the precoding matrix correlation indicated by the PMIS provided by the two user devices 102 and 103 is greater than a threshold, or the CRI is the same, or the BIs are the same, the proximity determination unit 304 determines that the proximity satisfies the predetermined condition.

In another example, the angle and the signal to interference and noise ratio of the transmission signal may also be used in combination to represent the proximity of the directions of the transmission signals. Specifically, when the base station 101 performs signal transmission simultaneously to at least two user devices, such as 102 and 103, if $\phi = \cos\theta_i - \cos\theta_j$ is smaller than the predetermined threshold and the SINRs provided by both user devices 102 and 103 are smaller than the predetermined threshold, the proximity determination unit 304 determines that the proximity satisfies the predetermined condition.

Some examples of the predetermined condition are listed above, but it should be understood that these are only examples and are not intended to limit the scope of the predetermined condition. The predetermined condition may include other examples, such as directly locating positions of two user devices and setting a threshold for the distance, or setting a threshold for the channel quality according to channel measurement results of sidelink between two user devices.

The activation number acquisition unit 305 may be configured to acquire, a number of antenna elements to be activated for downlink beamforming, which is determined based on the directions of the downlink transmission signals for the at least two user devices 102, 103. As described in section 1.2, by choosing the value at the trough point, i.e. activating only a part of the antenna elements but deactivating the other antenna elements, the interference between the user devices 102, 103 can be reduced and the optimal spectrum efficiency can be obtained. In a certain case, it is also possible to activate all antenna elements without deactivating any antenna element. An embodiment for determining the number of the antenna elements to be activated is described in detail in section 4 below.

In one example, the electronic device 300 further comprises an antenna array configured to directionally transmit radio beams to two target devices using the number of antenna elements based on the control of the processing circuit 303. Preferably, the electronic device 300 may be implemented as a radar device for radar detection of the two target devices, and the electronic device 300 further includes a radar receiver configured to receive radar signals reflected by the two target devices to determine the locations of the two target devices.

The communication unit 301 (transceiver) of the electronic device 300 may be configured to perform communication with the respective user devices 102, 103 under the control of the processing circuit 303.

In the embodiment of the present disclosure, the communication unit 301 may be implemented as a communication interface component such as an antenna device, a radio frequency circuit, and a partial baseband processing circuit. The communication unit 301 is depicted with dashed lines, since it may also be located within the processing circuit 303 or outside the electronic device 300.

The memory 302 may store information generated by the processing circuit 303, information received from the respective user devices 102, 103 via the communication unit 301, programs, machine codes and data for operations of the electronic device 300, and the sequence numbers of the above-mentioned beam directions, etc. The memory 302 is depicted with dashed lines, since it may also be located within the processing circuit 303 or outside the electronic device 300. The memory 302 may be a volatile memory and/or a non-volatile memory. For example, the memory 302 may include, but is not limited to, Random Access Memory (RAM), Dynamic Random Access Memory (DRAM), Static Random Access Memory (SRAM), Read Only Memory (ROM), and flash memory.

The various units described above are exemplary and/or preferred modules for implementing the processes described in this disclosure. These modules may be hardware units (such as a central processing unit, a field programmable gate array, a digital signal processor, or an application specific integrated circuit, etc.) and/or software modules (such as a computer readable program). The above does not describe in detail modules for carrying out the various steps described below. However, as long as there is a step for performing a certain process, there may be a corresponding module or unit (implemented by hardware and/or software) for implementing the same process. Technical solutions defined by all combinations of the steps described below and the units corresponding to the steps are included in the disclosed content of the present disclosure as long as the technical solutions constituted thereby are complete and applicable.

Further, a device constituted by various units may be incorporated as functional modules into a hardware device such as a computer. In addition to these functional modules, the computer may of course have other hardware or software components.

Figure 4:
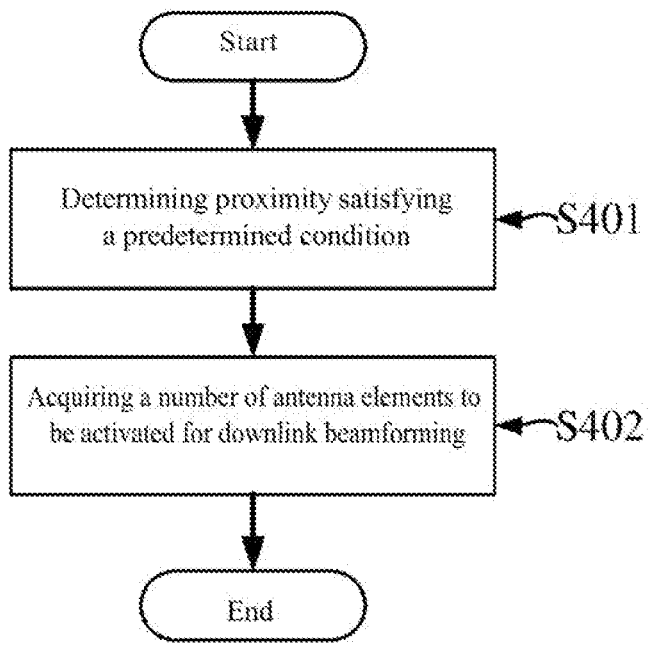
FIG. 4 illustrates a flow chart of a communication method according to an embodiment of the present disclosure.

3. Communication Method According to the Embodiments of the Present Disclosure FIG. 4 is a flowchart illustrating a communication method for an electronic device on the control device side according to an embodiment of the present disclosure. The communication method may be used, for example, in the electronic device 300 as shown in FIG. 3.

As shown in FIG. 4, at step S401 it is determined that signal transmission to at least two user devices such as 102, 103 is simultaneously performed and the proximity of directions of downlink transmission signals for the at least two user devices 102, 103 satisfies a predetermined condition. This step may be performed by the processing circuit 303 of the electronic device 300 depicted in FIG. 3, in particular by the proximity determination unit 304.

At step S402, an amount of antenna elements to be activated for downlink beamforming is acquired, the amount is determined based on the directions of downlink transmission signals for the at least two user devices 102, 103. This step may be performed by the processing circuit 303 of the electronic device 300 depicted in FIG. 3, in particular by the activation number acquisition unit 305. Similarly, by choosing the value at the trough point, i.e. activating only a part of the antenna elements and deactivating the other antenna elements, the interference between the user devices 102, 103 can be reduced and the optimal spectrum efficiency can be obtained.

4. Determination of the Number (Amount) of Antenna Elements According to the Embodiments of the Present Disclosure In the following, embodiments of how to determine the direction of the transmission signal are described first, and then embodiments of determining the number of antenna elements to be activated are described with emphasis.

4-1. Determination of the Direction of the Transmission Signal

4-1-1 Introduction to Beam Sweeping

In the massive MIMO system, the base station and the user equipment (UE) both have multiple antenna elements supporting the massive MIMO technology. The use of the massive MIMO techniques enables the base station and the UE to exploit the spatial domain to support spatial multiplexing, beamforming, and transmit diversity. Spatial multiplexing is typically used when status of channel is good. Beamforming may be used to concentrate the transmit energy in one or more directions when status of channel is less favorable. In order to better understand the determination of the direction of the transmission signal, beam sweeping in the massive MIMO system is described below with reference to FIGS. 1 and 2.

A downlink direction from the base station 101 to the user devices 102 to 104 is shown in FIG. 1, and an uplink direction from the user devices 102 to 104 to the base station 101 is not shown as required by the present disclosure and for simplicity. As shown in FIG. 1, the base station 101 includes 3 downlink transmission beams, and the user devices 102 to 104 include a certain number (for example, one in this embodiment, but not limited to one, and may be more) of downlink reception beams. In order to illustrate the proximity between the user devices according to the present disclosure herein, downlink reception beams of the user device, uplink transmission beams of the user device, and uplink reception beams of the base station are not shown. However, it should be understood that the coverage areas and the number of the uplink reception beams and the downlink transmission beams of the base station 101 may be the same or different according to the system requirements and settings, and the same also applies to the user device.

In the downlink beam sweeping process, for example, the downlink transmission beam 105 among the three downlink transmission beams of the base station 101 transmits a downlink reference signal CSI-RS1 to the user devices 102 to 104 by using CSI-RS resource 1, and the user device 102 receives the downlink reference signal through at least one downlink reception beam. Similarly, the user device 103 receives the downlink reference signal through at least one downlink reception beam and the user device 104 receives the downlink reference signal through at least one downlink reception beam.

In this way, the other two transmission beams 106 and 107 among the three downlink transmission beams of the base station 101 transmit downlink reference signals CSI-RS2 and CSI-RS3 to the user devices 102 to 104 by sequentially using the CSI-RS resources 2 and 3, and the user devices 102 to 104 receive the other two downlink reference signals CSI-RS2 and CSI-RS3 respectively through at least one downlink reception beam, that is, the downlink reception beams of the user devices 102 to 104 receive the reference signals on the three transmission beams in total from the base station 101.

The user device 102 measures the received three downlink reference signals CSI-RS1, CSI-RS2, and CSI-RS3 (e.g., measuring a received signal power (RSRP) of the downlink reference signals), thereby determining a sequence number of a downlink transmission beam with the best receiving quality among downlink transmission beams of the base station 101. In the example of FIG. 1, the user device 102 determines the beam with the sequence number 105 as its downlink transmission beam with the best receiving quality.

Similarly, the user device 103 measures the received three downlink reference signals, thereby determining a sequence number of the downlink transmission beam with the best receiving quality among the downlink transmission beams of the base station 101, such as 106. The user device 104 measures the received three downlink reference signals to determine a sequence number of the downlink transmission beam with the best receiving quality among the downlink transmission beams of the base station 101, such as 107. After determining the respective downlink transmission beam with the best receiving quality, the user devices 102 to 104 may send this information to the base station 101 through signaling of a communication protocol, for example, MAC layer signaling or PHY layer signaling on a physical uplink data channel PUSCH, or PHY layer signaling on a physical uplink control channel PUCCH, which is also described with reference to section 5 below.

The process of uplink beam sweeping is similar to downlink beam sweeping, and the embodiments of the present disclosure do not describe the uplink beam sweeping for the sake of simplicity. After the downlink beam sweeping and the uplink beam sweeping are finished, the determined transmission beam of the base station and the strongest reception/transmission beam of the user device are utilized to carry out the subsequent downlink transmission of data and/or control signals. The above process of determining the transmission beams of the base station and the user device through beam sweeping is sometimes referred to as a beam training process.

4-1-2. First Example of the Direction of the Transmission Signal

In this example, the directions of the downlink transmission signals for the user devices 102 to 104 are represented by the directions of the transmission beams for the user devices.

As described in sections 4-1-1, after the beam sweeping, the sequence numbers of the transmission beams for the respective user devices 102 to 104 are known by both the base station 101 and the user devices 102 to 104. Since the beamforming codebook, such as the DFT codebook described in section 6 below, is fixed during the period that the base station communicates with the user device through downlink beamforming using the result of the beam sweeping of this time, and the pointing direction (beam direction) of each transmission beam generated thereby is relatively fixed, the base station 101 and the user devices 102 to 104 all can know the beam direction of each transmission beam, so that the direction $\theta_i$ of the transmission signal can be directly expressed by the beam direction.

Next, as described in section 2, the processing circuit 303 may use the direction $\theta_i$ of the transmission signal thus obtained to determine the proximity $\phi=\cos\theta_i-\cos\theta_j$ of the two user devices 102, 103. If the proximity $\phi=\cos\theta_i-\cos\theta_j$ is less than a predetermined threshold, the proximity determination unit 304 determines that the proximity satisfies the predetermined condition.

Alternatively, in the case that the pointing direction (beam direction) of each transmission beam is relatively fixed, there is a correspondence relationship between the beam direction and the sequence number of the beam, so that the predetermined threshold can also be represented by a magnitude relationship between the sequence numbers of the beams, and its specific range can be determined by the number of codebooks of the base station and the proximity between different transmission beams determined by different codewords, e.g., ±1.2. For example, when the magnitude relationship between the sequence numbers of the beams for the different user devices 102, 103 is lower than a predetermined threshold, the proximity determination unit 304 determines that the proximity satisfies the predetermined condition.

As can be seen from the above description, once the sequence number of the transmission beam for the user device is determined through the beam sweeping process, both the base station and the user device can know the direction of the transmission signal transmitted by downlink beamforming. Determining the directions of the transmission signals from the sequence numbers of the transmission beams can quickly determine the directions of the transmission signals and then determine whether the proximity of the directions of the transmission signals satisfies the predetermined condition.

Furthermore, the determination of the direction of the transmission signal according to the sequence number of the transmission beam described in this example is less demanding on additional resources or operations and can be widely applied in various situations, such as frequency division duplex, FDD, and time division duplex, TDD.

4-1-3. Second Example of the Direction of the Transmission Signal

In the first example of sections 4-1-2 above, determining the direction of the transmission signal from the sequence number of the transmission beam can quickly determine the direction of the transmission signal. However, since the user device may be located at different locations within the range covered by the transmission beam, the direction of the transmitting signal from the base station to the user device may actually deviate from the beam direction of the transmission beam, thereby affecting the accuracy of the determination of the direction of the transmission signal.

Therefore, in this example, in order to improve accuracy of determination of the direction of the transmission signal, on the basis of the section 4-1-2, the present inventors propose to represent the directions of the downlink transmission signals for the user devices 102 to 104 according to the transmission angle of the downlink transmission signals from the base station 101 to these user devices.

Specifically, the user device, for example, the user device 102, may estimate a base station signal transmission angle at the location of the user device 102 by using the receiving quality for each downlink transmission beam by means of an interpolation method.

For example, in the case of the line-of-sight (LoS) channel, assuming that the transmission angle from the base station 101 to the user device 102 is $\alpha$, and the channel is $h(\alpha)$, the receiving quality of the user device 102 for the $K^{th}$ downlink transmission beam $b(\theta_k)$, k=1, . . . K respectively is:

$$q_k = |h(\alpha)b(\theta_k)^T| = \frac{1}{\sqrt{M}} \left| \frac{\sin\frac{\pi}{2}M(\cos\alpha - \cos\theta_k)}{\sin\frac{\pi}{2}(\cos\alpha - \cos\theta_k)} \right| \quad (7)$$

The receiving quality is obtained, for example, by measuring the received signal power (e.g., RSRP) of the downlink reference signal. From the thus obtained $q_k$, the beam direction $\theta_k$ and the number M of antenna elements known, a can be calculated according to the equation (7).

Preferably, the estimation of the transmission angle α can be made more accurately by averaging the calculation results of a plurality of transmission angles obtained according to a plurality of $q_k$.

Preferably, when the channel environment is complex, a more accurate a can be estimated by performing linear interpolation such as polynomial interpolation, or performing nonlinear interpolation, etc. to the plurality of transmission angles obtained according to the plurality of $q_k$.

For the other user devices 103, 104, their respective transmission angles may be calculated similarly. After calculating the respective transmission angles, the user device 102 to 104 may send the transmission angles to the base station 101 through, for example, a physical uplink data channel, which is also described in section 5 below.

Next, the processing circuit 303 may determine the proximity $\phi = \cos\theta_i - \cos\theta_j$ of the two user devices 102, 103 by using the thus obtained transmission angle as the direction $\theta_i$ of the downlink transmission signal. If the proximity $\phi = \cos\theta_i - \cos\theta_j$ is less than the predetermined threshold, the proximity determination unit 304 determines that the proximity satisfies the predetermined condition.

Other aspects not specifically described herein may be understood with reference to the first example in section 4-1-2.

4-1-4. Third Example of the Direction of the Transmission Signal

In both the first and second examples above, the sequence number of the beam as a result of the beam sweeping in section 4-1-1 is used to determine the direction of the transmission signal. In this example, a simpler way is proposed, that is, a channel with a reciprocal channel property is used to determine the direction of the downlink transmission signal directly according to the direction of the uplink transmission signal transmitted from the user devices 102 to 104 to the base station 101, without the need of using the sequence number of the beam.

The uplink transmission signal herein may be, for example, an uplink reference signal SRS (Sounding Reference Signal). In this case, the base station 101 performs uplink channel estimation according to the received uplink reference signal SRS, so as to obtain an arrival angle of the uplink transmission signal transmitted from the user devices 102 to 104 to the base station 101, i.e., an angle between the direction of the uplink transmission signal and the plane of the antenna array. Accordingly, because the channel has reciprocity, the transmission angle of the downlink transmission signal can be directly determined according to the arrival angle, as the direction of the downlink transmission signal.

Next, as described in section 2, the processing circuit 303 may use the thus obtained direction $\theta_i$ of the transmission signal to determine the proximity $\phi = \cos\theta_i - \cos\theta_j$ of the two user devices 102, 103. If the proximity $\phi = \cos\theta_i - \cos\theta_j$ is less than the predetermined threshold, the proximity determination unit 304 determines that the proximity satisfies the predetermined condition.

As is apparent from the above description, the present example does not utilize the sequence number of the transmission beam for the user device, which is determined through the beam sweeping process, and thus also avoids a deviation between the direction of the transmission signal from the base station to the user device and the beam direction of the transmission beam. In this example, by use of the channel reciprocity, the direction of the downlink transmission signal is determined directly from the direction of the uplink transmission signal, which enables to determine the directions of the downlink transmission signals quickly and accurately and then determine whether the proximity of the directions of the transmission signals satisfies the predetermined condition.

In this example, the uplink reference signal is chosen as SRS, but this is merely an example and does not limit the scope of the present disclosure. It should be understood that other uplink reference signals, such as DM-RS, may also be used for channel estimation to determine the direction of the uplink transmission signal.

The accuracy of this example in determining the direction of the transmission signal depends on the accuracy of performing channel estimation by the uplink reference signal to determine the direction of the uplink transmission signal. Many methods are known for determining the arrival angle of the uplink transmission signal, such as traditional ESPRIT (estimation of signal parameters by rotation invariant techniques), MUSIC (matrix feature based space decomposition) algorithm, and a signal arrival angle estimation method based on compression perception, etc.

Other aspects not specifically described herein may be understood with reference to the first example in section 4-1-2.

These are examples for determining the direction of the downlink transmission signal and are not intended to limit the scope of the present disclosure. In the case that the directions of the downlink transmission signals are determined and then it is determined that the proximity of the directions of the transmission signals satisfies the predetermined condition, the activation number acquisition unit 305 may acquire the number of antenna elements to be activated for downlink beamforming in the massive MIMO system, which is determined based on the directions of downlink transmission signals for the at least two user devices 102, 103. This will be explained in detail below.

4-2. Example 1 of the Determination of the Number of Antenna Elements

In this example, the activation number acquisition unit 305 determines the number of antenna elements to be activated for downlink beamforming based on the directions of the downlink transmission signals for at least two user devices 102, 103.

Assuming that the total number of antenna elements is M, let $b_i$ be a downlink beamforming vector for the $i^{th}$ user device under the condition of activating N antennas:

$$b_i = \frac{1}{\sqrt{N}}[1, e^{j\pi\cos\theta_i}, \ldots, e^{j\pi(N-1)\cos\theta_i}, 0_{1\times(M-N)}]^T \qquad (8)$$

where $\frac{1}{\sqrt{N}}$ is a power normalization factor, and $0_{1\times(M-N)}$ is a zero vector with $1\times(M-N)$ dimensions, which indicates that a vector element with an index $N \leq m \leq M-1$ takes zero.

Substituting the beamforming vector of the Equation (8) above into the Equation (3) above yields an average spectrum efficiency:

$$C = \log_2\left(1 + \frac{1}{A(N,\phi)^2 + \frac{\sigma_n^2}{N}}\right) \quad (9)$$

where $A(N,\phi)^2$ represents the interference between the user devices 102, 103, and $$\frac{\sigma_n^2}{N}$$

represents the noise power after beamforming. The denominator $$\left(A(N,\phi)^2 + \frac{\sigma_n^2}{N}\right)$$

shall be minimized if the average spectrum efficiency C is to be maximized. Therefore, by choosing the optimal number $N_{opt}$ of the antenna elements, the denominator $$\left(A(N,\phi)^2 + \frac{\sigma_n^2}{N}\right)$$

is minimized, i.e. the average spectrum efficiency C is maximized, as in Equation (10) below $$N_{opt} = \arg\max_{0<N\leq M} C = \arg\min_{0<N\leq M}\left(A(N,\phi)^2 + \frac{\sigma_n^2}{N}\right) \quad (10)$$

In a particular example, in a high signal-to-noise ratio environment, the noise power is small and negligible, and thus the interference between the user devices can be mainly considered. In this case, the above Equation (10) can be approximated as a sub-optimal solution, and the interference $A(N,\phi)^2$ between the user devices is minimized by selecting $N_{sub-opt}$, thereby the following equation is obtained:

$$N_{sub-opt} = \arg\min_{0<N\leq M}\frac{1}{A(N,\phi)} = \arg\max_{0<N\leq M}\frac{N}{\left|\sin\frac{\pi}{2}N\phi\right|} \quad (11)$$

As described in section 1.2 above, $$A(M,\phi) = \left|\sin\frac{\pi M}{2}\phi / M\sin\frac{\pi}{2}\phi\right|.$$

In this section, for $A(N,\phi)^2$, since the constant $\sin(\phi\pi 2)$ in the denominator does not affect the result, it can be neglected in the calculation. For further simplification, the linearity factor N may be neglected. In this case, the above Equation (11) can be further simplified as:

$$N_{sub-opt} \approx \arg\min_{0<N\leq M}\left|\sin\frac{\pi}{2}N\phi\right| = \arg\min_{0<N\leq M} B(N,\phi) \quad (12)$$

$B(N,\phi)$ can be obtained by a traditional exhaustive search method, that is, the number N of the antenna elements to be activated is searched in a progressively decreasing manner from the total number M of the antenna elements to 1, to determine the $N_{sub-opt}$ for downlink beamforming.

By presetting a threshold η, a candidate set $N_{sub-opt}$ is obtained as follows:

$$\mathbb{S}_N = \{N:B(N,\phi)\leq\eta\} \quad (13)$$

The final $N_{sub-opt}$ and $N_{opt}$ can be obtained from the following candidate sets:

$$N_{sub-opt} = \arg\max_{N\in\mathbb{S}_N}\frac{1}{A(N,\phi)}$$

$$N_{opt} = \arg\max_{0<N\leq M} C = \arg\min_{0<N\leq M}\left(A(N,\phi)^2 + \frac{\sigma_n^2}{N}\right)$$

4-3. Example 2 of Determination of the Number of Antenna Elements

In Example 1 of section 4-2, the complexity of $N_{opt}$ obtained by the traditional exhaustive search method is O(M). It can be seen that as the number M of antenna elements increases, the complexity is very high, which is very heavy for the processing circuit 303 or the activation number acquisition unit 305 and may lead to unduly prolonged computation time, and is not favorable for improving the efficiency of the communication system.

In this case, if the requirement on the result is not particularly strict, the number $N_{sub-opt}$ of antenna elements to be activated that makes a firstly searched out $B(N,\phi)$ smaller than the set threshold η, may be directly used for downlink beamforming, instead of selecting $N_{sub-opt}$ that minimizes $B(N,\phi)$ from the final set obtained by multiple searches. This is a way that can reduce complexity, but might not be able to obtain the $N_{sub-opt}$ that minimizes $B(N,\phi)$.

The inventors have made intensive work in order to not only reduce complexity but also obtain $N_{sub-opt}$ that minimizes $B(N,\phi)$. Specifically, the inventors have found through simulations that the asymptotic orthogonality $B(N,\phi)$ is a quasi-periodic sequence that varies with the number N of the antenna elements to be activated; for the conditions in this example, the space D between the antenna elements is half a wavelength D=λ/2, so the period T is approximately $$\frac{2}{\phi}.$$

Figure 5:
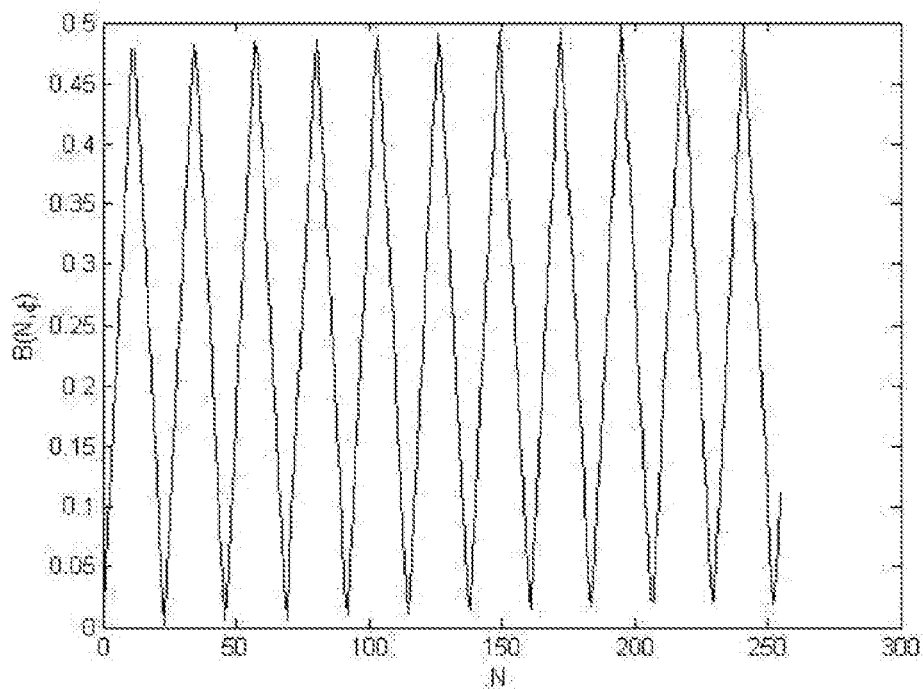
FIG. 5 is a graph illustrating asymptotic orthogonality $B(N,$ that varies with the number N of the activated antenna elements.

When $$\frac{N\pi}{2}$$

approaches an integer, the asymptotic orthogonality $B(N,\phi)$ is very close to 0. FIG. 5 is a graph illustrating the asymptotic orthogonality $B(N,\phi)$ that varies with the number N of the activated antenna elements.

In accordance with this property of $B(N,\phi)$, the inventors propose to determine the number $N_{sub-opt}$ of the antenna elements to be activated for downlink beamforming by periodically searching from the total number M of antenna elements. For example, when the first number $N_{sub-opt}$ of the antenna elements to be activated that makes $B(N,\phi)$ smaller than the set threshold η is searched out for the first time, the number of the antenna elements to be activated that makes $B(N,\phi)$ smaller than the set threshold η is no longer searched for in a descending manner from the first number $N_{sub-opt}$, but a new N value is obtained by subtracting the period from the first number $N_{sub-opt}$, and a search is performed around the N value to obtain a second number $N_{sub-opt}$ of the antenna elements to be activated that makes $B(N,\phi)$ smaller than the set threshold η, and so on, until all the numbers $N_{sub-opt}$ of the antenna elements to be activated that make $B(N,\phi)$ smaller than the set threshold η are searched out, as the above set.

The desirable $N_{sub-opt}$ candidate set is therefore quasi-periodically distributed with a search complexity of $$O\left(\frac{M\phi}{2}\right).$$

For the neighboring user devices 102, 103, φ is small, and thus the search complexity is greatly reduced.

In this example, the period T is approximated as $$\frac{2}{\phi}.$$

The period T of the search is determined according to the directions of the downlink transmission signals for the two user devices 102, 103 associated with φ, such that the closer the directions of the transmission signals are, the longer the period for the search is. For example, for the space D between the antenna elements, the period T is more generally expressed as $$\frac{\lambda}{\phi D}.$$

The predetermined threshold η may be determined based on an empirical value, or may be determined by a simulation result of FIG. 5. The determination of different predetermined thresholds η will result in different numbers of candidate values for $N_{sub-opt}$ in the set.

4-4. Example 3 of Determination of the Number of Antenna Elements

In both the foregoing determination Example 1 and determination Example 2, the number of the antenna elements to be activated is calculated in real time. Although we have derived a method capable of reducing complexity through simulation, real-time costs of computing resources and time still occur.

In this Example 3, a method is proposed to avoid real-time costs of computing resources and time through a static configuration in advance.

Specifically, the beamforming codebook, such as the DFT codebook, is fixed, so that the pointing direction (beam direction) of each transmission beam generated by the base station is relatively fixed, and therefore both the base station 101 and the user devices 102 to 104 can know the beam direction of each transmission beam.

Since the beam direction representing the direction of the downlink transmission signal can be known in advance, the correspondence between the beam direction and the number of the antenna elements to be activated can be calculated one by one in advance, directly using the calculation algorithms in the determination Example 1 and the determination Example 2.

Therefore, in this determination Example 3, the directions of all downlink transmission beams are stored in association with the respective numbers of the antenna elements to be activated calculated from the directions of all downlink transmission beams in advance, for example, in a table form, for use in downlink beamforming for the user devices.

In practice, as described in section 4-1-2, after the beam sweeping, the sequence numbers of the transmission beams for the respective user devices 102 to 104 are known by both the base station 101 and the user devices 102 to 104. As described in section 2, if it is determined that the proximity satisfies the predetermined condition, the number of antenna elements to be activated for the user device can be determined directly by searching through a pre-stored table. It can be seen that in the case where the direction of the downlink transmission signal can be expressed by the beam direction, this example avoids time-consuming real-time calculation through the static configuration in advance, thereby further improving the efficiency of determining the number of the antenna elements to be activated.

In the above three examples, regardless of whether the number is calculated in real time or pre-configured, the activation number acquisition unit 305 needs to determine the number of antenna elements to be activated for downlink beamforming based on the directions of the downlink transmission signals for at least two user devices 102, 103. In an alternative example, the number of antenna elements to be activated for downlink beamforming may be determined in the user device, and then the activation number acquisition unit 305 acquires the number through, for example, a physical uplink data channel, which will be described in detail in sections 5-3 and 5-4 below.

5. Communication Process According to the Embodiments of the Present Disclosure FIGS. 6A-6B and 7A-7B are schematic diagrams illustrating communication processes of the embodiments of the present disclosure, for a more detailed understanding of the implementations of the embodiments described above.

Figure 6A:
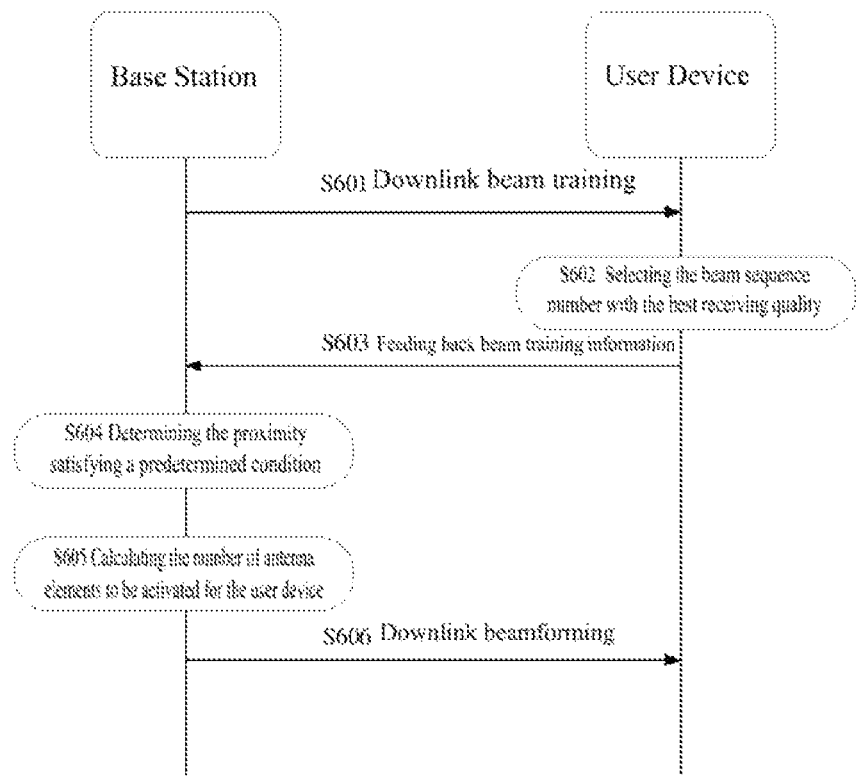
FIGS. 6A-7B illustrate schematic diagrams of communication processes according to different embodiments of the present disclosure.

5-1. First Example of a Process for Determining the Number of the Antenna Elements to be Activated FIG. 6A is a schematic diagram of a downlink communication process according to an embodiment of the present disclosure, which may be applied to the TDD downlink communication or the FDD downlink communication between the base station 101 and the user devices 102 to 104, where TDD and FDD are only examples and are not intended to limit the present disclosure.

The example is described below by taking the FDD downlink communication process as an example, but it should be understood that the description is also applicable to the TDD downlink communication process.

Steps S601 to S604 correspond to the step S401 in FIG. 4, and are used for determining that signal transmission to at least two user devices, such as 102 and 103 is simultaneously performed, and the proximity of the directions of downlink transmission signals for the at least two user devices 102 and 103 satisfies a predetermined condition.

In step S601, the base station 101 provides L downlink transmission beams for beam training based on, for example, a codebook containing L basic DFT codewords $c_l$.

In step S602, for each downlink transmission beam, the user device 102 calculates its receiving quality $Q_l$ including a quantized value of the noise power level, and selects the beam sequence number $l_o$ with the best receiving quality $Q_{l_o}$.

In one example, the noise power level may be in the form of reference signal received power, RSRP, and the noise level of the user device may be estimated approximately from the RSRP value received by the base station 101 as feedback. In another example, the noise power level may also be in the form of a signal to interference noise ratio, SINR, derived by the user device through channel estimation.

In step S603, the user device 102 feeds back beam training information to the base station 101, including the best beam sequence number $l_o$, and optionally, the quantized values corresponding to the receiving quality $Q_{l_o}$ and the noise power level. Similarly, the user device 103 feeds back beam training information to the base station, including the best beam sequence number $l_i$, and optionally, the quantized values corresponding to the receiving quality $Q_{l_i}$ and the noise power level.

In step S604, the base station 101 determines that signal transmission to at least two user devices, such as 102 and 103 is simultaneously performed, and the proximity of the directions of the downlink transmission beams for the at least two user devices 102 and 103 satisfies a predetermined condition, as described in sections 4-1-2 and 2, which is not repeated herein.

Steps S605-S606 correspond to the step S402 in FIG. 4, for determining the number of antenna elements to be activated for downlink beamforming based on the directions of the downlink transmission beams for the at least two user devices 102, 103.

In step S605, the base station 101 calculates the number $N_{sub-opt}$ of the antenna elements to be activated for the user devices 102, 103 based on the information transmitted (fed back) from the user devices 102, 103, including at least the best beam sequence number $l_o$ and a neighbor beam sequence number $l_i$.

Preferably, the base station 101 calculates the number $N_{opt}$ of the antenna elements to be for the user devices 102, 103 based on information transmitted (fed back) from the user device, including the best beam sequence number $l_o$ and a neighbor beam sequence number $l_i$ and a quantized value of the noise power level.

In one example, in the case where the noise power of the two user devices 102, 103 is the same, the number of the antenna elements to be activated calculated for each user device 102, 103 is the same.

In another example, in the case where the noise power of the two user devices 102, 103 is not the same, the number of the antenna elements to be activated calculated for each user device 102, 103 may be different. At this time, the average spectrum efficiency may be optimized, that is, one of the numbers of the antenna elements to be activated is selected, so that the average spectrum efficiency of downlink beamforming transmission is maximized.

In a preferred example, for a channel environment which is relatively stable for a long time, the noise power may be measured once when the user device initially accesses the base station, and then the measured noise power is used to calculate the number of the antenna elements to be activated, without feeding back the noise power level again. The noise power level is recalculated only if the status of channel changes or the downlink transmission beams for these user devices need to be switched, so that computing and transmission resources can be saved.

In step S606, the base station 101 activates the determined number of antenna elements to perform downlink beamforming. More details of this step will be described in section 6 in connection with an embodiment of a novel codebook of the present disclosure.

In a preferred example, the antenna elements to be activated are selected continuously among all antenna elements. The head and tail antenna elements among all antenna elements are also considered to be continuous with each other.

As described in section 4-1-2, the indication of the directions of the downlink transmission signals for the user devices 102 to 104 according to the sequence numbers of the downlink transmission beams from the base station 101 to these user devices can be applied to various scenarios quickly and widely, and thus the simplicity and applicability of the determination of the number of antenna elements to be activated can be improved.

Figure 6B:
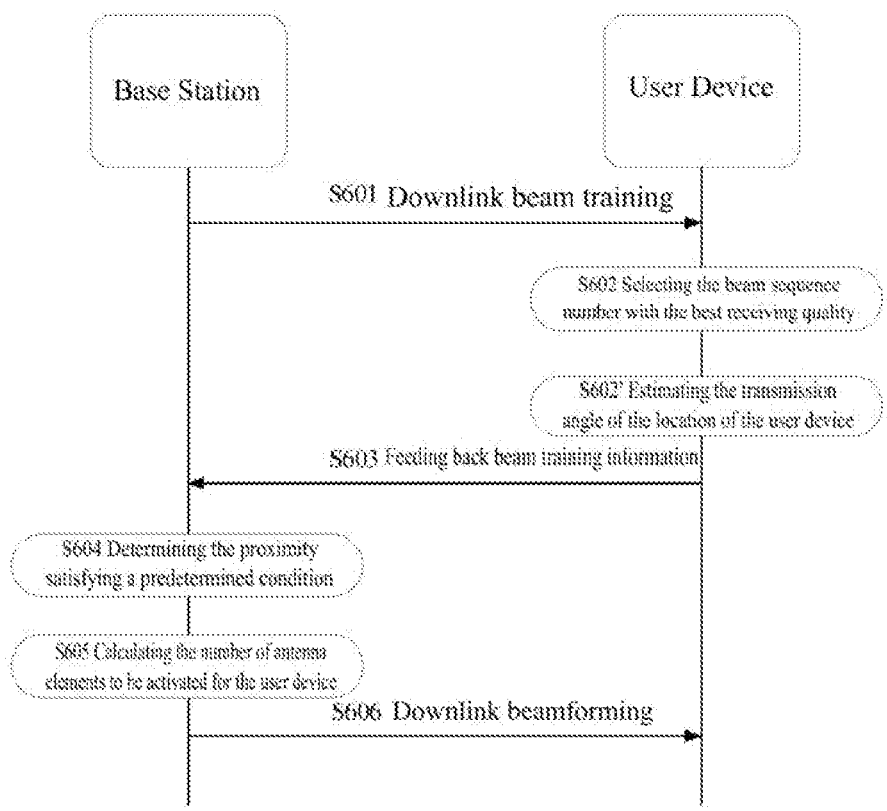

5-2. Second Example of a Process for Determining the Number of Antenna Elements to be Activated FIG. 6B is a schematic diagram of a downlink communication process according to an embodiment of the present disclosure, which may be applied to the TDD downlink communication or the FDD downlink communication between the base station 101 and the user devices 102 to 104, where TDD and FDD are only examples and are not intended to limit the present disclosure. Differences from the first example are mainly described below, and the same parts are not described again and can be understood with reference to the first example.

The second example is mainly different from the first example in the addition of a step S602'. In this step S602', according to the method described in section 4-1-3, the user device, for example, the user device 102, can estimate the transmission angle of the location of the user device 102 by using its receiving quality for each downlink transmission beam through an interpolation method.

Therefore, in step S603, the user device 102 feeds back beam training information to the base station 101, which includes the transmission angle for the user device 102, in addition to the best beam sequence number $l_o$, and optionally, the quantized values corresponding to the receiving quality $Q_{l_o}$ and the noise power level. Similarly, the user device 103 feeds back beam training information to the base station, which includes the transmission angle for the user device 103, in addition to the best beam sequence number $l_i$, and optionally, the quantized values corresponding to the receiving quality $Q_{l_i}$ and the noise power level.

In step S604, the base station 101 determines that signal transmission to at least two user devices, such as 102 and 103 is simultaneously performed, and the proximity of downlink transmission angles for the at least two user devices 102 and 103 satisfies a predetermined condition, as described in sections 4-1-3 and 2, which is not repeated herein.

In step S605, the base station 101 calculates the number $N_{sub\text{-}opt}$ or $N_{opt}$ of the antenna elements to be activated of the user device 102, 103 based on the information transmitted (fed back) from the user device, including at least the transmission angle.

As described in sections 4-1-3, by indicating the directions of downlink transmission signals for the user devices 102 to 104 according to the transmission angles of the downlink transmission signals from the base station 101 to the user devices, the accuracy of determination of the directions of the transmission signals and thus the accuracy of determination of the number of antenna elements to be activated can be improved.

Figure 6C:
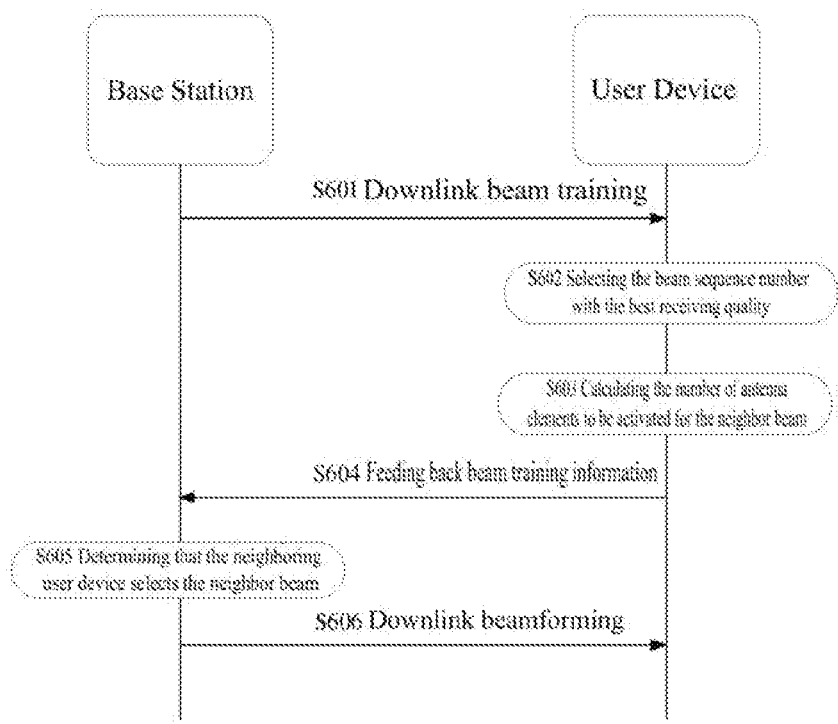

5-3. Third Example of a Process for Determining the Number of Antenna Elements to be Activated FIG. 6C is a schematic diagram of a downlink communication process according to an embodiment of the present disclosure, which may be applied to the TDD downlink communication or the FDD downlink communication between the base station 101 and the user devices 102 to 104, where TDD and FDD are only examples and are not intended to limit the present disclosure.

The example is described below by taking the FDD downlink communication process as an example, but it should be understood that the description is also applicable to the TDD downlink communication process. This example is a variant of the first example, with a main variation that the determination of the number of the antenna elements to be activated (step S603 in this example) is done at the user device side.

Step S605 corresponds to the step S401 in FIG. 4, for determining that the signal transmission to at least two user devices, such as 102, 103 is simultaneously performed, and that the proximity of the directions of the downlink transmission signals for the at least two user devices 102, 103 satisfies a predetermined condition. Step S603 corresponds to the step S402 in FIG. 4.

In step S601, the base station 101 provides L downlink transmission beams for beam training based on, for example, a codebook containing L basic DFT codewords $c_l$.

In step S602, for each downlink transmission beam, the user device 102 calculates its receiving quality $Q_l$ including a quantized value of the noise power level, and selects a beam sequence number $l_o$ with the best receiving quality $Q_{l_o}$.

In step S603, the user device 102 calculates the number $N_{opt}$ or $N_{sub\text{-}opt}$ of the antenna elements to be activated for its neighbor beams from the beam directions representing the directions of the downlink transmission signals.

In step S604, the user device 102 feeds back beam training information to the base station 101, including the best beam sequence number $l_o$ and optionally its corresponding receiving quality $Q_{l_o}$, the neighbor beam sequence number $l_i$, and the number $N_{opt}$ or $N_{sub\text{-}opt}$ of the antenna elements to be activated. The neighbor beam(s) refer(s) to beam(s) close to the beam with the best receiving quality, and the beam(s) form a relatively large interference to the user device, and it is needed to eliminate the interference by controlling the number of the antenna elements to be activated for beamforming. Herein, during the access process, the user device may report two (one on the left and on the right) or four (two on the left and two on the right) neighbor beams, and the specific number may be agreed with the base station, and for the neighbor beams, please see the threshold setting in section 4-1-2.

In step S605, the base station 101 determines that the neighbor user device 103 selects a neighbor beam $l_i$.

That is, the base station 101 determines that signal transmission to at least two user devices, such as 102 and 103 is simultaneously performed, and the proximity of the directions of the downlink transmission beams for the at least two user devices 102 and 103 satisfies the predetermined condition, as described in sections 4-1-2 and 2, which is not repeated herein.

In step S606, the base station 101 activates the determined number $N_{opt}$ or $N_{sub\text{-}opt}$ of antenna elements to perform downlink beamforming.

Figure 6D:
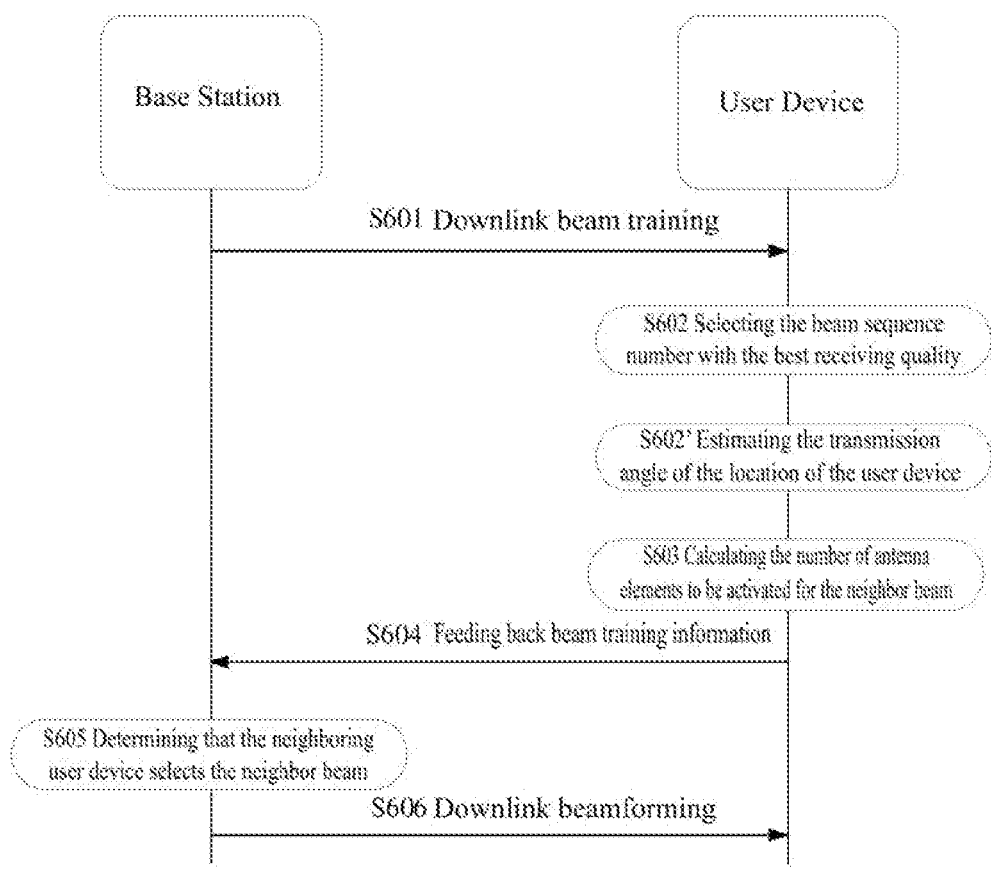

5-4. Fourth Example of a Process for Determining the Number of Antenna Elements to be Activated FIG. 6D is a schematic diagram of a downlink communication process according to an embodiment of the present disclosure, which may be applied to the TDD downlink communication or the FDD downlink communication between the base station 101 and the user devices 102 to 104. Differences from the third example are mainly described below, and the same parts are not described again and can be understood with reference to the third example.

This example is also a variant of the second example, and its main variation is that the determination of the number of the antenna elements to be activated (step S603 of this example) is made at the user device side.

The main difference between the fourth example and the third example is the addition of step S602'. In this step S602', according to the method described in sections 4-1-3, the user device, for example, the user device 102, can estimate the transmission angle of the location of the user device 102 by using its receiving quality for each downlink transmission beam through an interpolation method.

Therefore, in the step S603, the user device 102 calculates the number $N_{opt}$ or $N_{sub\text{-}opt}$ of antenna elements to be activated for its neighbor beam according to the transmission angle representing the direction of the downlink transmission signal and the beam direction of the neighbor beam $l_i$. The existence of such a difference is because each user device, such as user device 102, only calculates its own transmission angle without knowing the transmission angles of its neighboring user device, such as user device 103, and therefore the user device uses its own transmission angle and the neighbor beam direction, and cannot use the transmission angles of two neighboring user devices to calculate the number of antenna elements to be activated, like a base station. It follows that the accuracy of the fourth example is lower than that of the second example. The remaining steps may be understood with reference to the third example.

Figure 7A:
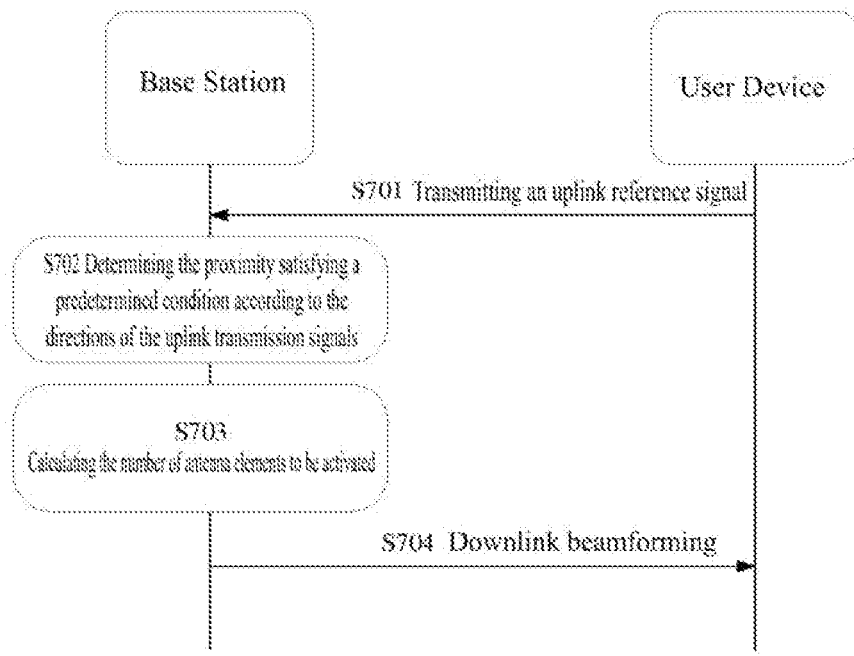

5-5 Fifth Example of a Process for Determining the Number of Antenna Elements to be Activated FIG. 7A is a schematic diagram of a downlink communication process according to an embodiment of the present disclosure, which may be applied to the communication with a reciprocal channel property between the base station 101 and the user devices 102 to 104, such as the TDD downlink communication, where TDD is an example and but does not limit the present disclosure.

The example is described in the following by taking the TDD downlink communication process as an example.

In step S701, the user device 102 transmits an uplink reference signal, e.g., an SRS signal, to the base station 101 for uplink channel estimation. Similarly, the user device 103 transmits an uplink reference signal, e.g., an SRS signal, to the base station 101 for uplink channel estimation.

In step S702, the base station 101 estimates the uplink channel according to the uplink reference signal and obtains the direction of the uplink transmission signal transmitted from the user device 102 to the base station 101, i.e. the signal arrival angle. Similarly, the base station 101 obtains the direction of the uplink transmission signal transmitted from the user device 103 to the base station 101. Then the base station 101 determines the transmission angle of the downlink transmission signal directly according to the arrival angle as the direction of the downlink transmission signal, and determines that the proximity of the directions of the downlink transmission beams for the at least two user devices 102, 103 satisfies a predetermined condition. For a detailed description, please refer to section 4-1-4, which is not repeated herein.

Preferably, the base station 101 estimates the uplink channel according to the uplink reference signal and obtains an uplink noise power.

In step S703, the base station 101 may calculate the number $N_{sub\text{-}opt}$ of the antenna elements to be activated according to the thus obtained directions of the transmission signals for the user devices.

Preferably, the base station 101 may calculate the number $N_{opt}$ of antenna elements to be activated according to the thus obtained directions and noise power of the transmission signals for the user devices. The number $N_{opt}$ may not be optimal because the noise power of the downlink communication may be different from the noise power of the uplink communication.

In step S704, the base station 101 activates the determined number of antenna elements to perform beamforming for downlink data transmission.

Portions that are not mentioned in this fifth example can be understood with reference to the first example. As described in section 4-1-4, by indicating the directions of the downlink transmission signals for the user devices 102, 103 according to the directions of the uplink transmission signals from these user devices to the base station 101, the directions of the downlink transmission signals can be determined quickly and accurately, and thus the efficiency of the determination of the number of antenna elements to be activated is improved.

Figure 7B:
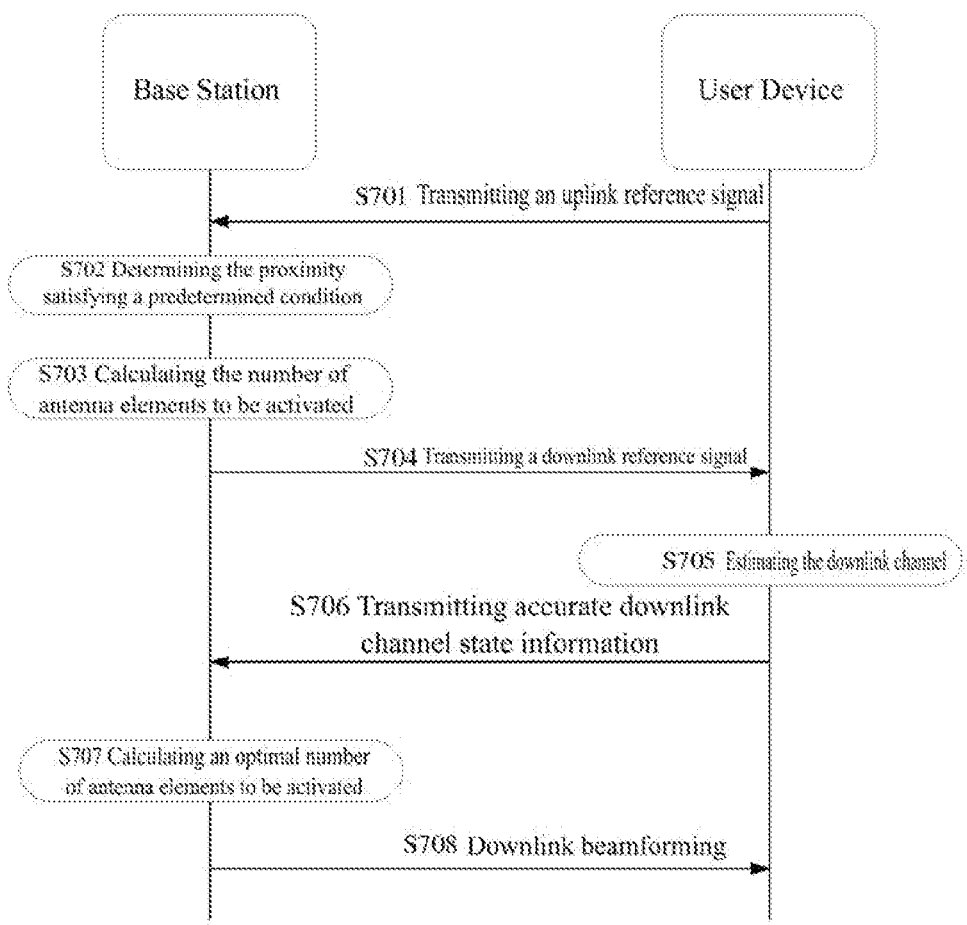

5-6 Sixth Example of a Process for Determining Number of Activated Antenna Elements FIG. 7B is a schematic diagram of a downlink communication process according to an embodiment of the present disclosure, which may also be applied to communication with a reciprocal channel property between the base station 101 and the user devices 102 to 104. Differences from the fifth example are mainly described below, and the same parts are not described again and can be understood with reference to the fifth example.

The main difference between the sixth example and the fifth example is that steps S705 to S708 are added so that the base station 101 calculates the optimal activation number $N_{opt}$.

In step S705, in the case where the base station 101 transmits a downlink reference signal, such as a CSI-RS, in step S704, the user devices 102, 103 estimate the downlink channel, so as to obtain downlink channel state information and its quantized value of the noise power.

In step S706, the user devices 102, 103 transmit (feedback) a more accurate quantized value of the noise power and possibly other downlink channel state information to the base station 101.

In step S707, the base station 101 calculates the optimal number $N_{opt}$ of antenna elements to be activated according to the quantized values of the noise power transmitted by the user devices 102, 103.

In step S708, the base station 101 activates the determined number $N_{opt}$ of antenna elements to perform downlink beamforming.

As described in the sixth example, by further transmitting the beamformed downlink reference signal, more accurate downlink channel state information and downlink noise power can be obtained, so that the base station 101 can calculate the optimal number $N_{opt}$ of the antenna elements to be activated more accurately than in the fifth example.

6. Codebook Design According to an Embodiment of the Present Disclosure

As described above, in step S606, the base station 101 activates the determined number of antenna elements to perform downlink beamforming. The present embodiment will now be described in conjunction with the inventors' innovative design.

Specifically, in the present embodiment, a novel codebook is designed so as to implement beamforming by activating the determined number of antenna elements under the existing transmission architecture.

6-1. Traditional Codebook Design

Codebook-based beamforming is to preset a beamforming codebook at a receiving end and a transmitting end, wherein the codebook comprises a plurality of beamforming matrixes. The receiving end firstly determines a transmission beam with the best receiving condition among a plurality of transmission beams of the transmitting end according to the beam sweeping process, and then feeds back indication information of the transmission beam, such as a sequence number and a resource where the transmission beam is located, to the transmitting end. The transmitting end selects an analog pre-coding matrix corresponding to the transmission beam according to the indication information to carry out beamforming.

For example, each transmission beam transmitted from the base station 101 to the user devices 102 to 104 can be generated by a DFT (Discrete Fourier Transform) vector, also called a codeword, and a set of these DFT vectors is called a DFT codebook. In the following, a downlink transmission beam at the base station side is taken as an example for description, and an uplink reception beam at the base station side and a transmission/reception beam at the user device side may also be generated similarly.

Assuming that the base station side is equipped with $n_t$ transmitting antennas, then an equivalent channel from the base station 101 to the user device can be represented as a vector H of $n_t+1$. The DFT vector u can be expressed as:

$$u = \begin{bmatrix} 1 & e^{j\frac{2\pi}{C}} & \dots & e^{j\frac{2\pi(n_t-1)}{C}} \end{bmatrix}^T \tag{14}$$

where the length of the DFT vector u is $n_t$, C represents a parameter for adjusting the width of the beam and the forming gain, and "T" represents a transpose operator.

The equivalent channel H from the base station to the user device is multiplied by the DFT vector u to obtain one transmission beam of the base station (e.g., one of the downlink transmission beams 105, 106, 107 shown in FIG. 1).

In one embodiment, the parameter C for adjusting the width of the beam and the forming gain in Equation (14) may be represented by a product of two parameters $O_2$, $N_2$, and the width of the beam and the forming gain may be adjusted by adjusting the two parameters $O_2$, $N_2$, respectively. Generally, the larger the number of antennas $n_t$ or the larger the parameter C (e.g., the product of $O_2$ and $N_2$) is, the stronger the spatial directivity of the resulting beam is, but the narrower the beam width is in general. In one embodiment, $O_2=1$ and $N_2=1$ may be taken, so that the resulting DFT vector u is a vector with $n_t$ elements all being 1.

6-2. Codebook Design of the Present Disclosure

Although the traditional DFT codebook is used for downlink beamforming and channel matching based on the DFT codebook in which each codeword is a DFT vector, the codewords in the traditional DFT codebook do not contain zero elements, and thus a phase shifter connected to each antenna element is required to rotate a certain phase, so it is impossible to control whether the antenna element is activated.

Therefore, the present disclosure proposes a novel codebook, i.e. a codebook for determining beamforming with respect to the determined number of antenna elements based on the determined number of antenna elements to be activated and a codebook for beamforming with respect to all antenna elements to be activated. The novel codebook comprises two layers, wherein the first layer is a traditional basic DFT codebook, noted as $C=[c_0, \ldots, c_L] \in \mathbb{C}^{M \times L}$, where $c_l$, $l=0, \ldots, L-1$ is the $l^{th}$ DFT codeword. The second layer is an activation indication codebook or matrix, with the following structure:

$$D = \text{diag}[1_{1 \times N_{opt}}, 0_{1 \times (M - N_{opt})}] \in \mathbb{R}^{M \times M} \quad (15)$$

where M is the total number of antenna elements and $N_{opt}$ is the calculated optimal number of antenna elements to be activated for the interfering user devices 102, 103, and the activation indication codebook is used to indicate that the phase shifter connected to the $(N_{opt} \leq m \leq M-1)^{th}$ antenna element is in the off state for e.g. the user devices 102, 103. And the finally generated beamforming codeword is obtained by multiplying the DFT codeword of the first layer by the activation indication matrix of the second layer, as follows:

$$b_l = Dc_l \quad (16)$$

By use of the novel codebook for beamforming, since different numbers of antenna elements can be activated for different user devices, a higher freedom of implementation can be provided for the beamforming with a part of the antenna elements being activated.

7. Structure of an Electronic Device on the Control Device Side According to an Embodiment of the Present Disclosure The structure of an electronic device implementing the novel codebook design described in section 6-2 is described below with reference to FIGS. 8A-8C.

A hybrid precoding structure of a phased array antenna is known in two forms, one being fully-connected and the other being sub-connected. Under the full-connected structure, each radio frequency chain is connected with all antenna elements. In the sub-connected structure, each radio frequency chain is connected to for example a part of the antenna elements, that is, each antenna element is connected to one radio frequency chain.

7-1 Examples of Fully-Connected Structures

Figure 8A:
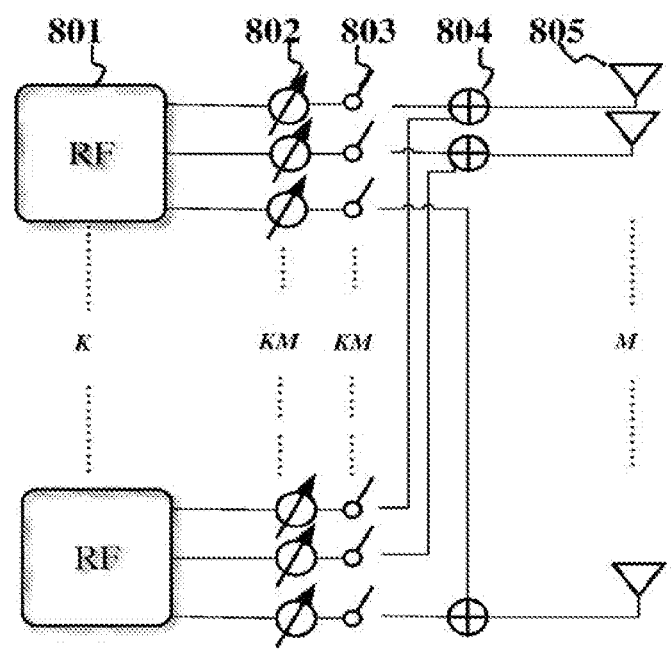
FIGS. 8A-8C illustrate block diagrams of electronic devices according to the embodiments of the present disclosure.

FIG. 8A illustrates an example of a fully-connected structure of an electronic device according to an embodiment of the present disclosure. In addition to the communication unit 301, the memory 302 and the processing circuit 303, which are generally shown in the block diagram of FIG. 3, the electronic device further comprises: radio frequency chain units 801, each of which delivers a data stream to a phase shifter 802; phase shifters 802, each of which is used for beamforming a signal of the received data stream; switches 803 connected between each phase shifter 802 and each antenna element 805, each of which is used for controlling activation or deactivation of an antenna element corresponding to it based on the control signal of the processing circuit 303; and an array of antennas, each activated antenna element 805 of which is used for transmitting the beamformed signal. In addition, the electronic device may further comprise a combiner 804 for combining the signals from the RF chain units to the corresponding antenna elements 805.

As described above, each radio frequency chain unit 801 is coupled to all antenna elements in the fully-connected structure. Thus, for the structure of FIG. 8A, assuming that there are M antenna elements 805 and K RF chain units 801 corresponding to K user devices, then K×M phase shifters are required in total. The beamforming made by the phase shifter 802 may adjust the phase of the signal of the received data stream, e.g., based on the DFT codeword corresponding to the downlink transmission beam from the processing circuit 303.

In the structure shown in FIG. 8A, unlike the traditional fully-connected structure, there are also provided switches 803 connected between each phase shifter 802 and the corresponding antenna element 805, which may be various types of switches (e.g., switching diodes) suitable for radio frequency chains. In this example, the switches may correspond to phase shifters, and since K×M phase shifters are provided in total, K×M switches are provided correspondingly. Switch 805 may control whether the signal of the data stream transmitted by the radio frequency chain unit can be transmitted by a corresponding antenna element. For example, when the first switch 803 is switched on, the signal of the data stream transmitted by the first radio frequency chain unit 801 may be delivered to the corresponding first antenna element 805 and transmitted by the antenna element 805 after being beamformed by the corresponding first phase shifter 802, and at this time the antenna element 805 is activated for the first radio frequency chain unit 801. When the first switch 803 is switched off, the signal of the data stream transmitted by the first radio frequency chain unit 801 cannot be delivered to the corresponding first antenna element 805 after being beamformed by the first phase shifter 802, and at this time the first antenna element 805 is deactivated for the first radio frequency chain unit 801. The operating principle of the other switches is similar. Thus, viewed from a specific radio frequency chain unit, each switch may be used to control activation or deactivation of the antenna element corresponding to that switch. The activated antenna element can transmit the corresponding beamformed signal; the deactivated antenna elements do not transmit the corresponding beamformed signal.

According to an example, the control of the switch 803 on the activation or deactivation of the antenna element 805 corresponding to the switch may be based on the control signal from the processing circuit 303. The processing circuit 303 provides the control signal based on the determined number of antenna elements to be activated, which may specify activation of N antenna elements (N being less than or equal to M), such as the activation indication matrix described in section 6.2, to reduce interference between beamformed transmissions for different user devices and improve spectrum efficiency as described previously. When the control signal specifies activation of N antenna elements, N switches may be switched on and the remaining (M−N) switches may be switched off for the corresponding RF chain units 801, such that the corresponding activated antenna elements are N continuous antenna elements. In other examples, the control signal may also specifically specify which N continuous antenna elements are to be activated.

Although FIG. 8A shows that the switch 803 is located farther away from the radio frequency chain unit 801 with respect to phase shifter 802, it can be understood that the switch 803 may also be located between the phase shifter 802 and the radio frequency chain unit 801 in alternative examples. Such a structure has the following advantages: since the switches 803 correspond to the phase shifters 802 one by one, different numbers of antenna elements can be allowed to be activated for different radio frequency chain units, thereby enabling the use of different numbers of activated antenna elements for different user devices. This is advantageous when the noise power levels for two user devices interfering with each other are different or the number of user devices is K>2, since different numbers N of antenna elements to be activated may be obtained for different user devices. For example, when K=3, in order to reduce the interference with the beamforming transmission for the user device 3 caused by the user devices 1 and 2, the number N1 of antenna elements to be activated may be obtained for the user devices 1 and 3, the optimal number N2 of antenna elements to be activated may be obtained for the user devices 2 and 3, and N1 is not equal to N2. In this case, N1 switches among the first group of M switches may be switched on for the first radio frequency chain units 801 corresponding to the user device 1, and N2 switches among the second group of M switches may be switched on for the second radio frequency chain units 801 corresponding to the user device 2, the N1 and N2 switches being independent of each other.

Figure 8B:
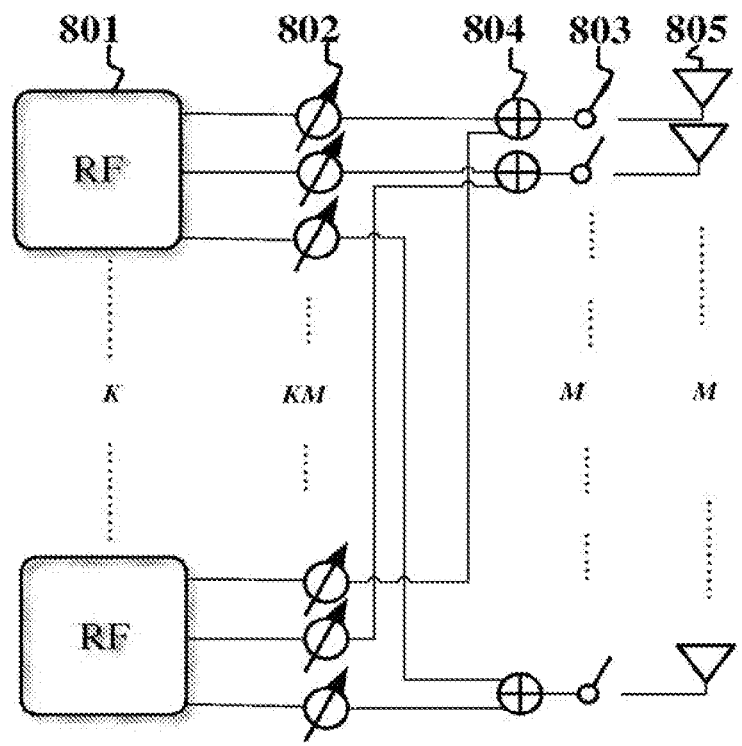

In the above example, the switches 803 correspond to the phase shifters 802 one by one. Although not shown, according to other preferred examples of the present disclosure, the switches may also directly correspond to the antenna elements one by one, i.e. there are a total of M switches. FIG. 8B shows a preferred example of the fully-connected structure of an electronic device according to an embodiment of the present disclosure, where the switch 803 is located before the antenna element 805 and after the combiner 804. In this preferred example, it can be seen that the number of switches is M, which is significantly smaller than the number of switches K×M in the example of FIG. 8A. This preferred example therefore greatly reduces the cost of the fully-connected structure. Also in this case, when the first switch 803 is switched on, signals on all radio frequency chains coupled to the corresponding first antenna elements 805 can be transmitted by that antenna element 805; when the switch is switched off, signals on all radio frequency chains coupled to the corresponding first antenna elements 805 cannot be transmitted by that antenna element 805. The operation of the other switches is similar. In the preferred example, since the on or off of the switch affects all radio frequency chain units corresponding to all user devices, a different number of activated antenna elements cannot be used for each user device, but only a single number of activated antenna elements can be used. For example, when the noise power levels for two user devices interfering with each other are different or the number of user devices is K>2, one number of antenna elements to be activated may be determined such that the average spectrum efficiency for these user devices is optimal.

According to an alternative example of the present disclosure, instead of using the switches 803 to control the activation and deactivation of the antenna elements 805, signals of the received data stream may be beamformed by phase shifters based on the novel codebook of beamforming. For the phase shifter, in a variant, a novel phase shifter that can take zero is employed, in which variant the processing circuit 303 selects an activation indication matrix according to the determined number of antenna elements to be activated, and at the same time selects a DFT codeword corresponding to the respective downlink transmission beam, and multiplies the DFT codeword with the activation indication matrix for controlling the phase of the novel phase shifter. In another variant, the traditional phase shifter in combination with an amplifier is employed, wherein the amplitude of the amplifier may be zeroed, in which variant the processing circuit 303 selects an activation indication matrix according to the determined number of antenna elements to be activated, while selecting the DFT codeword corresponding to the respective downlink transmission beam, multiplying the DFT codeword with the activation indication matrix for controlling the amplitude and phase of the traditional phase shifter in combination with the amplifier. Other structures are the same as the previous examples in this section and are not described again. The advantage of this alternative example is to allow the use of the traditional fully-connected structure without switches.

7-2 Examples of the Sub-Connected Structure

Figure 8C:
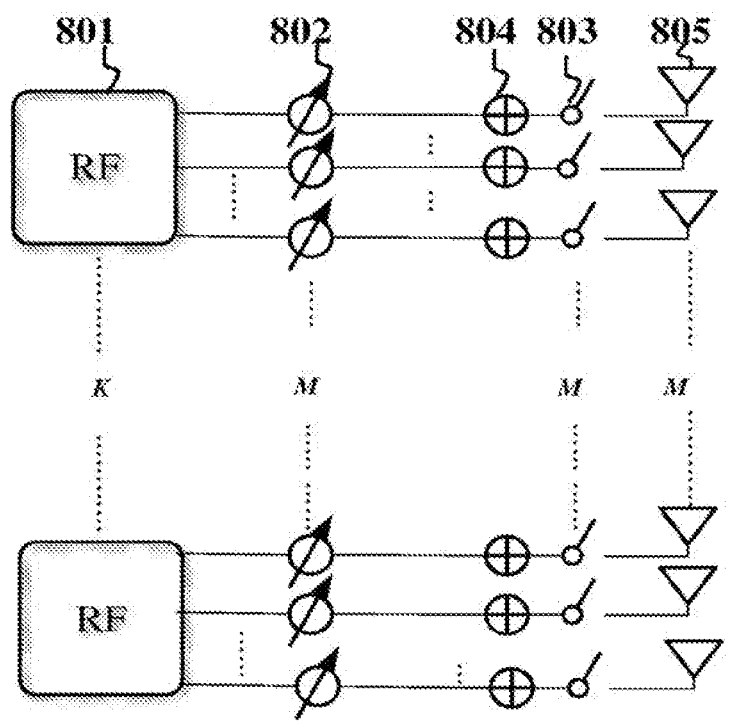

FIG. 8C illustrates an example of the sub-connected structure of an electronic device according to an embodiment of the present disclosure. Similar to the structure of FIG. 8A, in addition to the communication unit 301, the memory 302, and the processing circuit 303 generally shown in the block diagram of FIG. 3, the electronic device further comprises: radio frequency chain units 801, each of which delivers a data stream to a phase shifter 802; phase shifters 802, each of which is used for beamforming a signal of the received data stream; switches 803 connected between each phase shifter 802 and each antenna element 805, each of which is used for controlling activation or deactivation of an antenna element corresponding to it based on the control signal of the processing circuit 303; and an array of antennas, each activated antenna element 805 of which is used for transmitting the beamformed signal. In addition, the electronic device may further comprise a combiner 804 for combining the signals from the RF chain units to the corresponding switch 803. In some other examples, the electronic device may not comprise a combiner if the number of phase shifters and antenna elements is the same.

The differences between the sub-connected structure and the full-connected structure are mainly described below, and other undescribed contents can be understood with reference to section 7-1.

As mentioned above, in the sub-connected structure, each radio frequency chain unit 801 is connected to for example M/K antenna elements, i.e. each antenna element 805 is connected to one radio frequency chain unit 801. Thus, for the structure of FIG. 8C, assuming that there are M antenna elements 805 and K RF chain units 801 corresponding to K user devices, M phase shifters are required in total.

In this example, the switch 803 may correspond to the phase shifter 802, and since M phase shifters are provided in total, M switches are provided correspondingly. Switch 803 may control whether the signal of the data stream transmitted by the radio frequency chain unit 801 can be transmitted by a corresponding antenna element. Similarly, control of the switch 803 on activation or deactivation of the antenna element 805 corresponding to the switch may be based on the control signal from the processing circuit 303.

Although FIG. 8C shows that the switch 803 is positioned closer to the antenna element 805 than the phase shifter 802, it can be understood that the switch 803 may be positioned between the phase shifter 802 and the radio frequency chain unit 801 in alternative examples. Regardless of the position of the switch 803, the sub-connected structure of FIG. 8C can attain the following advantage: since the switch 803 can always correspond to the phase shifter 802 and thus to the radio frequency chain unit 801, it may allow for different numbers of antenna elements to be activated for different radio frequency chain units, thereby enabling the use of different numbers of activated antenna elements for different user devices.

According to an alternative example of the present disclosure, instead of using the switches 803 to control the activation and deactivation of the antenna elements, the signals of the received data streams may be beamformed by the phase shifter based on the novel codebook for beamforming, which is similar to the description in section 7-1 and will not be described again. The advantage of this alternative example is to allow the use of the traditional sub-connected structure without switches.

8. Electronic Device on the User Device Side According to the Present Disclosure Embodiments of an electronic device and a communication method on the user device side are described below with reference to FIG. 9A to 11B.

8-1. First Embodiment

8-1-1. Structure of the Electronic Device

FIG. 9A is a block diagram illustrating an electronic device 9000, such as a smartphone, on the user device side according to an embodiment of the present disclosure.

The electronic device 9000 according to the first embodiment may comprise, for example, a communication unit 9001, a memory 9002 and a processing circuit 9003.

The processing circuit 9003 of the electronic device 9000 provides various functions of the electronic device 9000. For example, the processing circuit 9003 of the electronic device 9000 may comprise: a beam determination unit 9004, an antenna number determination unit 9005 and a feedback unit 9006. The beam determination unit 9004 may determine a receiving quality for each transmission beam for transmission beam training, as described in the step S602 of the section 5-3. The antenna number determination unit 9005 may determine a number of antenna elements to be activated for downlink beamforming transmission to the electronic device 9000 according to the beam directions of the transmission beam with the best receiving quality and its neighbor transmission beams, as described in the step S603 of the section 5-3. The feedback unit 9006 may feedback sequence numbers of the beam with the best receiving quality and the neighbor beams as well as the number to another electronic device initiating the transmission beam training, e.g., the electronic device 300 described in the section 2, as described in the step S604 of the section 5-3.

The communication unit 9001 of the electronic device 9000 may be configured to perform communication with the aforementioned electronic device 300 under the control of the processing circuit 9003. The communication unit 9001 is depicted with dashed lines, as it may also be located within the processing circuit 9003 or external to the electronic device 9000.

The memory 9002 may store information generated by the processing circuit 9003, information received from the electronic device 300 via the communication unit 9001, programs and data for operation of the electronic device 9000, and resource allocation parameters. The memory 9002 is depicted with dashed lines, as it can also be located within the processing circuit 9003 or external to the memory 9002. The memory 9002 can be a volatile memory and/or non-volatile memory. For example, the memory 9002 may include, but is not limited to, Random Access Memory (RAM), Dynamic Random Access Memory (DRAM), Static Random Access Memory (SRAM), Read Only Memory (ROM), and flash memory. Other undescribed content can be understood with reference to the section 2 and will not be described further herein.

8-1-2 Communication Method Performed by the Electronic Device

FIG. 9B is a flowchart illustrating a communication method for an electronic device on the user device side of the present disclosure. This communication method can be used for the electronic device 9000 as shown in FIG. 9A, for example.

As shown in FIG. 9B, in step S9007, the receiving quality for each transmission beam for transmission beam training is determined, as described in the step S602 of the section 5-3.

In step S9008, the number of antenna elements to be activated for downlink beamforming transmission to the electronic device is determined according to the beam directions of the transmission beam with the best receiving quality and its neighbor transmission beams, as described in the step S603 of the section 5-3.

In step S9009, the sequence numbers of the beam with the best receiving quality and the neighbor beams and the number are fed back to another electronic device initiating the transmission beam training, for example, the electronic device 300 described in the section 2, as described in the step S604 of the section 5-3.

8-2 Second Embodiment

8-2-1. Structure of the Electronic Device

FIG. 10A is a block diagram illustrating an electronic device 1000, such as a smartphone, on the user device side according to an embodiment of the present disclosure.

The electronic device 1000 according to the second embodiment may include, for example, a communication unit 1001, a memory 1002, and a processing circuit 1003.

The processing circuit 1003 of the electronic device 1000 provides various functions of the electronic device 1000. For example, the processing circuit 1003 of the electronic device 1000 may include: a beam determination unit 1004, a transmission angle calculation unit 1005, an antenna number determination unit 1006, and a feedback unit 1007. The beam determination unit 1004 may determine a receiving quality for each transmission beam for transmission beam training, as described in the step S602 of the section 5-3. The transmission angle calculation unit 1005 may calculate, for a transmission beam with the best receiving quality, a transmission angle of a downlink transmission signal from another electronic device initiating the transmission beam training, for example, the electronic device 300 described in the section 2, to the electronic device, as described in step S602' of the section 5-4. The antenna number determination unit 1006 may determine a number of antenna elements to be activated for downlink beamforming transmission to the electronic device according to the transmission angle and the beam directions of the neighbor transmission beams of the transmission beam with the best receiving quality, as described in the step S603 of the section 5-3. The feedback unit 1007 may feedback the transmission angle, the sequence numbers of the transmission beam with the best receiving quality and the neighbor transmission beams, and the number to the other electronic device initiating the transmission beam training, as described in the step S604 of the section 5-3.

The communication unit 1001 and the memory 1002 of the electronic device 1000 are similar to those of the first embodiment, and can be understood with reference to the section 8-1-1, which are not repeated herein.

8-2-2 Communication Method Performed by the Electronic Device

FIG. 10B illustrates a flowchart of a communication method for an electronic device on the user device side of the present disclosure. The communication method may be used, for example, for the electronic device 1000 shown in FIG. 10A.

As shown in FIG. 10B, in step S1008, a receiving quality for each transmission beam for transmission beam training is determined, as described in the step S602 of the section 5-3.

In step S1009, the transmission angle(s) of the downlink transmission signals from another electronic device initiating the transmission beam training to the electronic device is calculated, with respect to the transmission beam with the best receiving quality, as described in the step S602' of the section 5-4.

In step S1010, the number of antenna elements to be activated for downlink beamforming transmission to the electronic device is determined according to the transmission angles and the beam directions of the neighbor transmission beams of the transmission beam with the best receiving quality, as described in the step S603 of the section 5-3.

In step S1011, the transmission angles, the sequence numbers of the transmission beam with the best receiving quality and the neighbor transmission beams, and the number are fed back to the other electronic device initiating the transmission beam training, for example, the electronic device 300 described in the section 2, as described in the step S604 of the section 5-3.

8-3. Third Embodiment

8-3-1. Structure of the Electronic Device

FIG. 11A is a block diagram illustrating an electronic device 1100, such as a smartphone, on the user device side according to an embodiment of the present disclosure.

The electronic device 1100 according to the third embodiment may include, for example, a communication unit 1101, a memory 1102, and a processing circuit 1103.

The processing circuit 1103 of the electronic device 1100 provides various functions of the electronic device 1100. For example, the processing circuit 1103 of the electronic device 1100 may include: a transmission unit 1104, a reception unit 1105, an estimation unit 1106 and a feedback unit 1107. The transmission unit 1104 may transmit an uplink reference signal to another electronic device, for example, the electronic device 300 described in the section 2, for calculating the direction of the uplink reference signal, as described in the step S701 of the section 5-5. The reception unit 1105 may receive a downlink reference signal, where the downlink reference signal is transmitted though downlink beamforming by another electronic device using the number of antenna elements to be activated for downlink beamforming, which is determined according to the direction of the uplink reference signal, as described in the steps S702 to S704 of the section 5-5. The estimation unit 1106 is optional, and can estimate the downlink channel through the downlink reference signal, as described in the step S705 of the section 5-6. The feedback unit 1107 is also optional, and may feedback the noise power to the other electronic device, as described in the step S706 of the section 5-6.

The communication unit 1101 and the memory 1102 of the electronic device 1100 are similar to those of the first embodiment, and can be understood with reference to the section 8-1-1, which are not repeated herein.

8-3-2 Communication Method Performed by the Electronic Device

FIG. 11B illustrates a flowchart of a communication method for an electronic device on the user device side of the present disclosure. The communication method may be used, for example, in an electronic device 1100 as shown in FIG. 11A.

As shown in FIG. 11B, in step S1108, an uplink reference signal is transmitted to another electronic device, for example, the electronic device 300 described in the section 2, for calculating the direction of the uplink reference signal, as described in the step S701 of the section 5-5.

In step S1109, a downlink reference signal is received, where the downlink reference signal is sent though downlink beamforming by the another electronic device using the number of antenna elements to be activated for downlink beamforming, which is determined according to the direction of the uplink reference signal, as described in the steps S702 to S704 of the section 5-5.

Step S1110 is optional, wherein the downlink channel is estimated through the downlink reference signal, as described in the step S705 of the section 5-6.

Step S1111 is optional, wherein the noise power is fed back to the other electronic device, as described in the step S706 of the section 5-6.

9. User Scheduling According to the Present Disclosure

As shown in FIG. 1, in a massive MIMO system, the channel correlation between different user devices is high and interference is large.

In a traditional user scheduling strategy, in order to reduce interference, user devices interfering with each other are allocated in different time-frequency resource blocks, so as to avoid strong interference between multiple user devices.

In the embodiments of the present disclosure, because performing downlink beamforming with respect to the determined number of antenna elements can reduce interference between the user devices, the user devices interfering with each other may be allocated in the same or overlapping time-frequency resource blocks by adjusting the number of activated antenna elements.

FIG. 12 illustrates the number of resource blocks employed for user scheduling in a traditional orthogonal manner (left) and the number of resource blocks employed according to an embodiment of the present disclosure (right), in the case of two user devices interfering with each other. It can be seen through comparison that the embodiment according to the present disclosure saves system resources and improves the degree of freedom of user scheduling.

10. Other Embodiments

10-1. Mode for Activating Antenna Elements

In the embodiment of the present disclosure, assuming that $N_{sub\text{-}opt}$ antenna elements need to be activated, then $M\text{-}N_{sub\text{-}opt}$ antenna elements need to be turned-off. The activated $N_{sub\text{-}opt}$ antenna elements can be the first $N_{sub\text{-}opt}$ antenna elements among the M antenna elements, or $N_{sub\text{-}opt}$ antenna elements selected in the middle, or the last $N_{sub\text{-}opt}$ opt antenna elements.

In particular embodiments, it is also possible to alternately activate odd numbered ones of the M antenna elements and deactivate even numbered ones of the M antenna elements, and vice versa.

Preferably, the activated antenna elements are continuous $N_{sub\text{-}opt}$ antenna elements to ensure that the activated antenna elements still have a uniform linear antenna array ULA channel structure.

10-2. Spacing of the Antenna Elements

Embodiments of the present disclosure may be applicable to common antenna arrays, such as uniform linear antenna arrays ULA, uniform planar arrays UPA, uniform circular arrays UCA, and the like.

Embodiments of the present disclosure may vary with the space of the antenna elements. Preferably, for a uniform antenna array, i.e. the space D of the antenna elements is the same, the foregoing embodiments of the present disclosure can be applicable with adaptive amendments.

For example, in the foregoing embodiments, the description is made based on the assumption $D=\lambda/2$.

For other space D, let the wavelength be $\lambda$, the corresponding expressions (5), (8) and $A(N,\varphi)$ become the following forms:

$$h_i = \left[1, e^{-j\frac{D}{\lambda}2\pi\cos\theta_i}, \ldots, e^{-j\frac{D}{\lambda}2\pi(M-1)\cos\theta_i}\right]^T$$

$$b_i = \frac{1}{\sqrt{N}}\left[1, e^{j\frac{D}{\lambda}2\pi\cos\theta_i}, \ldots, e^{j\frac{D}{\lambda}2\pi(N-1)\cos\theta_i}, 0_{1\times(M-N)}\right]^T,$$

$$A(N, \phi) = \left|\sin\frac{D\pi N}{\lambda}\phi / M\sin\frac{D\pi}{\lambda}\phi\right|,$$

and the method for determining the number of antenna elements to be activated is not changed, but the period for searching in the section 5-3 becomes $\lambda/(\varphi D)$, for the same direction of the downlink transmission signal.

10-3. Interference of Multiple (>2) User Devices

Although the embodiments of the present disclosure are described above by taking two interfering user devices as an example, the embodiment of the present disclosure is applicable to the case where the number of user devices interfering with each other is K>2.

In this embodiment, for the $i^{th}$ user device, the base station 101 needs to calculate the number $N_{opt}^i$ of antenna elements to be activated by the base station. $\phi=_{ij}=\cos\theta_i-\cos\theta_j$, $1\leq i\neq j\leq K$ is different for a respective pair composed of a respective neighboring user device of the user device and the user device. Due to the presence of multiple pairs of neighboring user devices, the number of antenna elements to be activated for different pairs of user devices interfering with the $i^{th}$ user device is also different in practical implementations, and it is required that each phase shifter from each user data stream to the antenna element is controlled by a separate switch.

The above process is repeated for each user device, resulting in a different set of activation numbers:

$$\mathbb{N}_i = \{\mathbb{S}_N^{i,j}\}$$

where $\mathbb{S}_N^{i,j}$ is a set of activation numbers determined for the $i^{th}$ and $j^{th}$ user devices.

Then, the activation numbers for different user devices are selected from the set $\mathbb{N}_i\{\mathbb{S}_N^{i,j}\}$ so that the average spectrum efficiency is maximized:

$$\{N_{opt}^1, \ldots N_{opt}^K\} = \underset{N\in\mathbb{N}_i}{\operatorname{argmax}} C_i.$$

11. Simulation According to the Embodiments of the Present Disclosure

In order to evaluate the performance of the electronic device and the communication method according to the embodiments of the present disclosure, the inventors conducted the following comparative experiments on the embodiments of the present disclosure and the traditional conjugate transposed beamforming transmission.

Considering a single cell system, the number of interfering user devices is K=2, and a difference between downlink transmission angles $\Delta\theta=|\theta_1-\theta_2|$ indicates the proximity of the user devices. The base station adopts $M_t=128$ antenna elements, and the user device end adopts $M_r=16$ antenna elements. Because the user device end also adopts multiple antennas for transmission, the user device end can further reduce the noise power after the downlink beamforming with respect to the interference between the user devices through multiple reception beams. In this case, the Equation (10) becomes:

$$N_{opt} = \arg\max_{0<N\leq M_t} C = \arg\min_{0<N\leq M_t} \left(A(N, \phi)^2 + \frac{\sigma_n^2}{NM_r}\right)$$

The normalized signal-to-noise ratio $$SNR = \frac{1}{\sigma_n^2} = 0 dB$$

before the beamforming is adopted. The results of the comparison are shown in FIGS. 13A-13C.

FIG. 13A shows a comparison in the average downlink spectrum efficiency between the traditional conjugate transposed beamforming and the embodiment of the present disclosure, in the case of different fixed transmission angle differences. It can be seen that the downlink average spectrum efficiencies obtained by performing partial activation beamforming on $N_{opt}$ and $N_{sub-opt}$ antenna elements in the embodiments of the present disclosure are all greater than that obtained in the traditional scheme, and especially when $\Delta\theta$ is small, the improvement on the average spectrum efficiency is more significant.

FIG. 13B shows a comparison in performance between the traditional conjugate transposed beamforming and the embodiments of the present disclosure, in the case of different SNRs when the transmission angle difference is fixed at $\Delta\theta=2°$. It can be seen that the embodiments of the present disclosure can obtain a more significant improvement on the downlink average spectrum efficiency at different SNRs.

FIG. 13C shows a comparison in performance between the traditional conjugate transposed beamforming and the embodiments of the present disclosure when the base station employs a 64×64 planar array in a 3D-MIMO scenario. The embodiments of the present disclosure still can attain a performance gain. The gain is more significant especially when the signal-to-noise ratio is higher.

12. Application Examples of the Present Disclosure

The techniques of this disclosure can be applied to a variety of products.

For example, the user side electronic devices 9000, 1000 and 1100 may be realized as a mobile terminal (such as a smartphone, a tablet personal computer (PC), a notebook PC, a portable game terminal, a portable/encrypted dongle type mobile router, and a digital camera apparatus) or an in-vehicle terminal (such as a car navigation device). The user side electronic device can also be realized as a terminal (that is also referred to as a machine type communication (MTC) terminal) that performs machine-to-machine (M2M) communication. Furthermore, the user side electronic device may be a wireless communication module (such as an integrated circuit module including a single die) mounted on each of the above terminals.

For example, the control device side electronic device 300 may be realized as any type of base station, preferably a macro gNB and a small gNB in a New Radio (NR) access technology, such as 5G communication standard of 3GPP. The small gNB may be a gNB covering a cell smaller than a macro cell, such as a pico gNB, a micro gNB, and a home (femto) gNB. Alternatively, the control device may be realized as any other type of base station, such as a NodeB and a Base Transceiver Station (BTS). The control device may include: a main body (also referred to as a base station apparatus) configured to control wireless communication, and one or more Remote Radio Heads (RRHs) provided in a place different from the main body.

12-1. Examples of Applications Relating to the Control Device Side Electronic Device (First Application Example)

It should be understood that the term base station in this disclosure has a full breadth of its ordinary meaning and includes at least a wireless communication station that is used to facilitate communications as part of a wireless communication system or radio system. Examples of the base station may be for example, but not limited to, the following: the base station may be one or both of a Base Transceiver Station (BTS) and a Base Station Controller (BSC) in a GSM system, one or both of a Radio Network Controller (RNC) and a NodeB in a WCDMA system, an eNB in LTE and LTE-Advanced systems, or a corresponding network node in future communication systems (e.g., a gNB, which may occur in a 5G communication system, etc.). In D2D, M2M, and V2V communication scenarios, a logical entity having a control function for the communication may also be referred to as a base station. In a cognitive radio communication scenario, a logical entity playing a role in spectrum coordination may also be referred to as a base station.

FIG. 14 is a block diagram illustrating a first example of a schematic configuration of the control device side electronic device 300 to which the technique of the present disclosure can be applied, wherein the electronic device 300 is shown as a gNB 800. The gNB 800 includes a plurality of antennas 810 and a base station device 820. The base station device 820 and each antenna 810 may be connected to each other via a RF cable.

Each of the antennas 810 includes multiple antenna elements (such as multiple antenna elements included in a multiple input multiple output (MIMO) antenna), and is used for the base station device 820 to transmit and receive radio signals. The gNB 800 may include the multiple antennas 810, as illustrated in FIG. 14. For example, the multiple antennas 810 may be compatible with multiple frequency bands used by the gNB 800. Although FIG. 14 illustrates the example in which the gNB 800 includes the multiple antennas 810, the gNB 800 may also be used for implementing the massive MIMO system according to the embodiments of the present disclosure.

The base station device 820 includes a controller 821, a memory 822, a network interface 823, and a wireless communication interface 825.

The controller 821 may be, for example, a CPU or a DSP, and operates various functions of higher layers of the base station device 820. For example, the controller 821 may include the processing circuit 300 described above to determine the number of antenna elements to be activated in accordance with the methods described above, or to control various components of the electronic device 300. For example, the controller 821 generates data packets from data in signals processed by the wireless communication interface 825, and transfers the generated packets via the network interface 823. The controller 821 may bundle data from multiple base band processors to generate bundled packet(s) and transfer the generated bundled packet(s). The controller 821 may have logic functions of performing control such as radio resource control, radio bearer control, mobility management, admission control, and scheduling. This control may be performed in conjunction with a gNB or a core network node in the vicinity. The memory 822 includes RAM and ROM, and stores program that is executed by the controller 821, and various types of control data (such as a terminal list, transmission power data, and scheduling data).

The network interface 823 is a communication interface for connecting the base station device 820 to the core network 824. The controller 821 can communicate with a core network node or another gNB via the network interface 823. In this case, the gNB 800, and the core network node or other gNB(s) may be connected to each other through a logical interface (such as Si interface and X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme (such as LTE and LTE-Advanced), and provides radio connection to terminal(s) positioned in a cell of the gNB 800 via the antenna 810. The wireless communication interface 825 may typically include, for example, a baseband (BB) processor 826 and an RF circuit 827. The BB processor 826 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)). The BB processor 826 may have a part or all of the above-described logic functions instead of the controller 821. The BB processor 826 may be a memory that stores a communication control program, or a module that includes a processor and related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 14. For example, the multiple BB processors 826 may be compatible with multiple frequency bands used by the gNB 800. The wireless communication interface 825 may include the multiple RF circuits 827, as illustrated in FIG. 14. For example, the multiple RF circuits 827 may be compatible with multiple antenna elements. Although FIG. 14 illustrates the example in which the wireless communication interface 825 includes the multiple BB processors 826 and the multiple RF circuits 827, the wireless communication interface 825 may also include a single BB processor 826 or a single RF circuit 827.

In the gNB 800 shown in FIG. 14, one or more components (the proximity determination unit 304 and the activation number acquisition unit 305) included in the processing circuit 303 described with reference to FIG. 3 may be realized in the wireless communication interface 825. Alternatively, at least a portion of these components may be realized in the controller 821. For example, the gNB 800 contains a portion (e.g., BB processor 826) or the entirety of the wireless communication interface 825 and/or a module including the controller 821, and one or more components can be realized in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 800, and the wireless communication interface 825 (e.g., BB processor 826) and/or the controller 821 may execute the program. As described above, as an apparatus including one or more components, the gNB 800, the base station apparatus 820, or a module may be provided, and a program for allowing the processor to function as the one or more components may be provided. In addition, a readable medium in which the program is recorded may be provided.

In addition, in the gNB 800 shown in FIG. 14, the communication unit 301 described with reference to FIG. 3 may be realized in the wireless communication interface 825 (e.g., the RF circuit 827). In addition, the communication unit 301 may be realized in the controller 821 and/or the network interface 823.

(Second Application Example)

FIG. 15 is a block diagram illustrating a second example of a schematic configuration of the control device side electronic device 300 to which the technology of the present disclosure may be applied. The control device may include for example the electronic device 300 for downlink transmission. The electronic device 300 is shown as gNB 830. The gNB 830 includes one or more antennas 840, a base station device 850, and an RRH 860. The RRH 860 and each antenna 840 may be connected to each other via an RF cable. The base station device 850 and the RRH 860 may be connected to each other via a high speed line such as an optic fiber cable.

Each of the antennas 840 includes a single or multiple antenna elements (such as multiple antenna elements included in a MIMO antenna) and is used for the RRH 860 to transmit and receive radio signals. The gNB 830 may include the multiple antennas 840, as illustrated in FIG. 15. For example, the multiple antennas 840 may be compatible with multiple frequency bands used by the gNB 830. Although FIG. 15 illustrates the example in which the gNB 830 includes the multiple antennas 840, these antennas 840 may be used to implement the massive MIMO system in the embodiments of the present disclosure.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 14.

The wireless communication interface 855 supports any cellular communication scheme (such as LTE and LTE-Advanced) and provides wireless communication to terminal(s) positioned in a sector corresponding to the RRH 860 via the RRH 860 and the antennas 840. The wireless communication interface 855 may typically include, for example, a BB processor 856. The BB processor 856 is the same as the BB processor 826 described with reference to FIG. 14, except that the BB processor 856 is connected to the RF circuit 864 of the RRH 860 via the connection interface 857. The wireless communication interface 855 may include multiple BB processors 856, as illustrated in FIG. 15. For example, the multiple BB processors 856 may be compatible with multiple frequency bands used by the gNB 830. Although FIG. 15 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communicating in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 15. For example, the multiple RF circuits 864 may support multiple antenna elements. Although FIG. 15 illustrates the example in which the wireless communication interface 863 includes the multiple RF circuits 864, the wireless communication interface 863 may also include a single RF circuit 864.

In the gNB 830 illustrated in FIG. 15, the one or more components (the proximity determination unit 304 and the activation number acquisition unit 305) included in the processing circuit 303 described with reference to FIG. 3 may be realized in the wireless communication interface 855. Alternatively, at least a portion of these components may also be realized by the controller 851. For example, the gNB 830 may contain a portion (e.g., the BB processor 856) or the entirety of the wireless communication interface 855, and/or a module including the controller 851, and one or more components may be realized in the module. In this case, the module may store a program for allowing the processor to function as one or more components (in other words, a program for allowing the processor to perform operations of one or more components), and may execute the program. As another example, a program for allowing the processor to function as one or more components can be installed in the gNB 830 and executed by the wireless communication interface 855 (e.g., the BB processor 856) and/or the controller 851. As described above, as an apparatus including one or more components, the gNB 830, the base station apparatus 850, or a module may be provided, and a program for allowing the processor to function as the one or more components may be provided. In addition, a readable medium in which the program is recorded may be provided.

In addition, in the gNB 830 shown in FIG. 15, the communication unit 301 described with reference to FIG. 3 may be realized in the wireless communication interface 855 (e.g., the BB circuit 856). In addition, the communication unit 301 may be realized in the controller 851 and/or the network interface 853.

12-2. Application Examples Regarding User-Side Electronic Device

First Application Example

FIG. 16 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and other layer(s) of the smartphone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates captured image(s). The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives operation(s) or information input from a user. The display device 910 includes a screen such as a liquid crystal display (LCD) and an organic light emitting diode (OLED) display, and displays an output image of the smartphone 900. The speaker 911 converts audio signals that are output from the smartphone 900 to sounds.

The wireless communication interface 912 supports any cellular communication scheme (such as LTE and LTE-Advanced) and performs wireless communication. The wireless communication interface 912 may typically include, for example, a BB processor 913 and an RF circuit 914. The BB processor 913 may perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may be one chip module that has the BB processor 913 and the RF circuit 914 integrated thereon. The wireless communication interface 912 may include the multiple BB processors 913 and the multiple RF circuits 914, as illustrated in FIG. 16. Although FIG. 16 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme, such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna) and is used for the wireless communication interface 912 to transmit and receive wireless signals. Smartphone 900 may include multiple antennas 916, as illustrated in FIG. 16. Although FIG. 16 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 16 via feeder lines, which are partially shown as dashed lines in the figure. The auxiliary controller 919 operates a minimum necessary function of the smartphone 900, for example, in a sleep mode.

In the smartphone 900 illustrated in FIG. 16, the one or more components included in the processing circuits 9003, 1003 and 1103 described with reference to FIGS. 9A, 10A, 11A may be realized in the wireless communication interface 912. Alternatively, at least some of these components may also be realized by the processor 901 or the auxiliary controller 919. As one example, the smartphone 900 contains a portion (e.g., the BB processor 913) or the entirety of the wireless communication interface 912 and/or a module that includes the processor 901 and/or the secondary controller 919, and one or more components may be realized in the module. In this case, the module may store a program that allows the processor to function as one or more components (in other words, a program for allowing the processor to perform the operation of one or more components), and may execute the program. As another example, a program for allowing the processor to function as one or more components may be installed in the smartphone 900, and the wireless communication interface 912 (e.g., the BB processor 913), the processor 901, and/or the auxiliary controller 919 may execute the program. As described above, as an apparatus including one or more components, the smartphone 900 or a module may be provided, and a program for allowing the processor to function as the one or more components may be provided. In addition, a readable medium in which the program is recorded may be provided.

In addition, in the smartphone 900 shown in FIG. 16, for example, the communication units 9001, 1001, and 1101 described with reference to FIGS. 9A, 10A, and 11A may be realized in the wireless communication interface 912 (e.g., the RF circuit 914).

Second Application Example

FIG. 17 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC and controls a navigation function and other function(s) of the car navigation device 920. The memory 922 includes RAM and ROM, and stores data and program that is executed by the processor 921.

The GPS module 924 uses GPS signals received from a GPS satellite to measure a position (such as latitude, longitude, and altitude) of the car navigation device 920. The sensor 925 may include a group of sensors, such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives operation(s) or information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme (such as LTE and LTE-Advanced) and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may also be one chip module having the BB processor 934 and the RF circuit 935 integrated thereon. The wireless communication interface 933 may include the multiple BB processors 934 and the multiple RF circuits 935, as illustrated in FIG. 17. Although FIG. 17 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme, such as a short-distance wireless communication scheme, a near-field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna) and is used for the wireless communication interface 933 to transmit and receive wireless signals. The car navigation device 920 may include the multiple antennas 937, as illustrated in FIG. 17. Although FIG. 17 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 17 via feeders lines that are partially shown as dashed lines in the figure. The battery 938 accumulates power supplied from the vehicle.

In the car navigation device 920 illustrated in FIG. 17, the one or more components included in the processing circuits 9003, 1003, 1103 described with reference to FIGS. 9A, 10A, 11A may be realized in the wireless communication interface 933. Alternatively, at least some of these components may also be realized by the processor 921. As one example, the car navigation device 920 includes a portion (e.g., BB processor 934) or the entirety of the wireless communication interface 933, and/or a module that includes the processor 921, and one or more components can be realized in the module. In this case, the module may store a program that allows the processor to function as one or more components (in other words, a program for allowing the processor to perform the operation of one or more components), and may execute the program. As another example, a program for allowing the processor to function as one or more components may be installed in the car navigation device 920, and the wireless communication interface 933 (e.g., the BB processor 934) and/or the processor 921 may execute the program. As described above, as an apparatus including one or more components, the car navigation device 920 or a module may be provided, and a program for allowing the processor to function as one or more components may be provided. In addition, a readable medium in which the program is recorded may be provided.

In addition, in the car navigation device 920 shown in FIG. 17, for example, the communication units 9001, 1001, and 1101 described with reference to FIGS. 9A, 10A, and 11A may be realized in a wireless communication interface 933 (for example, the RF circuit 935).

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and failure information, and outputs the generated data to the in-vehicle network 941.

In addition, a readable medium in which the program is recorded may be provided. Accordingly, the present disclosure also relates to a computer-readable storage medium on which a program including instructions, which, when loaded and executed by a processor such as a processing circuit or a controller, implement the aforementioned communication method, is stored.

Although some specific embodiments of the present disclosure have been described in detail, it should be understood by those skilled in the art that the above embodiments are illustrative only and do not limit the scope of the present disclosure. Those skilled in the art would appreciate that the above-described embodiments may be combined, modified or substituted without departing from the scope and spirit of the present disclosure. The scope of the present disclosure is defined by the appended claims.

The invention claimed is:

1. An electronic device comprising:
a processing circuit, configured to:
    determine transmitting signals simultaneously to at least two user devices and proximity of directions of downlink transmission signals for the at least two user devices satisfying a predetermined condition; and
    acquire, an amount of antenna elements to be activated for downlink beamforming, which is determined based on the directions of downlink transmission signals fix the at least two user devices,
wherein the processing circuit is further configured to determine the amount of antenna elements that are to be activated for downlink beamforming based on one of the following:
    proximity between directions of transmission beams used for the at least two user devices;
    proximity between transmission angles of downlink transmission signals from the electronic device towards the at least two user devices; and
    noise power.

2. The electronic device of claim 1, wherein the processing circuit is further configured to store in advance the directions of all downlink transmission beams in association with the respective amount of antenna elements to be activated that is determined based on the directions of all downlink transmission beams, so as to be used for downlink beamforming for the at least two user devices.

3. The electronic device of claim 1, wherein the processing circuit is further configured to determine the directions of downlink transmission signals for the at least two user devices based on directions of uplink transmission signals from the at least two user devices towards the electronic device.

4. The electronic device of claim 1, wherein the processing circuit is further configured to use feedback information from the at least two user devices to obtain the directions of the downlink transmission signals for the at least two user devices.

5. The electronic device of claim 4, wherein the feedback information includes a sequence number of a transmission beam with the best receiving quality for the at least two user devices and/or a transmission angle of a downlink transmission signal from the electronic device towards the at least two user devices, wherein the transmission beam with the best receiving quality is obtained via a beam training process.

6. The electronic device of claim 1, wherein the processing circuit is further configured to obtain the directions of downlink transmission signals for the at least two user devices using the uplink reference signals from the at least two user devices.

7. The electronic device of claim 1, wherein the processing circuit is further configured to obtain the noise power using feedback information from the at least two user devices.

8. The electronic device of claim 7, wherein the processing circuit is further configured to obtain the noise power if a status of channel has charged or the downlink transmission beams for the at least two user devices need to be switched.

9. The electronic device of claim 1, wherein the processing circuit is further configured to set a predetermined threshold based on at least one of: angles, sequence numbers of the downlink transmission beams, and signal to interference plus noise ratio representing the directions of downlink transmission signals for the user devices, and the predetermined condition is satisfied in the case that the proximity between directions of downlink transmission signals for the at least two user devices is lower than the predetermined threshold.

10. The electronic device of claim 1, wherein the processing circuit is further configured to determine the amount of antenna elements to be activated for downlink beamforming through a degressive search or periodic search starting from the total number of antenna elements.

11. The electronic device of claim 10, Wherein the processing circuit is further configured to, in the case of degressive search, adopt directly the amount of antenna elements to be activated for downlink beamforming through a first search; and in the case of periodic search, determine a period for search based on directions of downlink transmission signals for the at least two user devices, such that the closer the directions of the downlink transmission signals are, the longer the period for search is.

12. The electronic device of claim 1, wherein the processing circuit is further configured to determine the amount of antenna elements to be activated for downlink beamforming so as to maximize average spectrum efficiency.

13. The electronic device of claim 12, wherein the processing circuit is further configured to enable allocating downlink transmission for the at least two user devices into a same time-frequency resource block or overlapping time-frequency resource blocks.

14. The electronic device of claim 1, wherein the electronic device further comprises:
a plurality of radio frequency chain units, each of which transmits a data stream to a phase shifter;
phase shifters, each of which performs beamforming on a signal of the received data stream;
switches, each of which is connected between a corresponding phase shifter and a corresponding antenna element, and is used to control the activation or deactivation of an antenna element corresponding thereto based on a control signal from the processing circuit; and
an antenna array, in which each activated antenna element is used to transmit the beamformed signal.

15. The electronic device of claim 1, wherein the electronic device is configured to determine a codebook for beamforming with respect to the determined amount of antenna elements, based on the amount of antenna elements to be activated and a codebook for beamforming with respect to all antenna elements to be activated, and
the electronic device further comprising:
a plurality of radio frequency chain units, each of which transmits a data stream to a phase shifter;
phase shifters, each of which performs beamforming on a signal of the received data stream based on the codebook for beamforming with respect to the determined amount of antenna elements; and
an antenna array, for transmitting the beamformed signal.

16. The electronic device of claim 1, wherein a space between the antenna elements is uniform.

17. An electronic device comprising:
a processing circuit, configured to:
determine a receiving quality for each transmission beam used for a transmission beam training;
determine, based on beam directions of a transmission beam with the best receiving quality and its neighbor transmission beams, an amount of antenna elements to be activated for downlink beamforming transmission for said electronic device; and
feed the amount and the sequence numbers of the transmission beam with the best receiving quality and its neighbor transmission beams back to another electronic device that initiates the transmission beam training.

18. An electronic device, characterized in that it comprises:
a processing circuit, configured to:
determine a receiving quality for each transmission beam used for a transmission beam training;
calculate transmission angles of downlink transmission signals from another electronic device that initiates the transmission beam training towards the electronic device, with respect to the transmission beam with the best receiving quality;
determine, based on the transmission angles and beam directions of neighbor transmission beams of the transmission beam with the best receiving quality, an amount of antenna elements to be activated for downlink beamforming transmission for said electronic device; and
feed the transmission angles, the amount and the sequence numbers of the transmission beam with the best receiving quality and the neighbor transmission beams back to the other electronic device that initiates the transmission beam training.

19. An electronic device, characterized in that it comprises:
a processing circuit, configured to:
transmit an uplink reference signal to another electronic device to calculate a direction of the uplink reference signal;
receive a downlink reference signal, which is transmitted though downlink beamforming by the other electronic device using an amount of antenna elements to be activated for downlink beamforming, wherein the amount of antenna elements to be activated for downlink beamforming is determined based on the direction of the uplink reference signal; and
estimate the downlink channel through the downlink reference signal, and feed noise power back to the other electronic device.

* * * * *